(12) United States Patent
Wang et al.

(10) Patent No.: US 12,322,074 B2
(45) Date of Patent: Jun. 3, 2025

(54) CORRECTIVE LIGHTING FOR VIDEO INPAINTING

(71) Applicant: Adobe Inc., San Jose, CA (US)

(72) Inventors: Oliver Wang, Seattle, WA (US); John Nelson, Seattle, WA (US); Geoffrey Oxholm, Albany, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/375,187

(22) Filed: Sep. 29, 2023

(65) Prior Publication Data

US 2024/0046430 A1 Feb. 8, 2024

Related U.S. Application Data

(63) Continuation of application No. 17/196,581, filed on Mar. 9, 2021, now Pat. No. 11,823,357.

(51) Int. Cl.
*G06T 5/77* (2024.01)
*G06T 7/269* (2017.01)

(52) U.S. Cl.
CPC .............. *G06T 5/77* (2024.01); *G06T 7/269* (2017.01); *G06T 2207/10016* (2013.01)

(58) Field of Classification Search
CPC . G06T 5/77; G06T 7/269; G06T 2207/10016; G06T 5/60; G06T 2207/20081
See application file for complete search history.

(56) References Cited

U.S. PATENT DOCUMENTS

| | | | |
|---|---|---|---|
| 6,667,774 B2 | 12/2003 | Berman et al. | |
| 9,741,144 B2 | 8/2017 | Paris et al. | |
| 9,892,537 B2 | 2/2018 | Paris et al. | |
| 10,049,435 B2 | 8/2018 | Paris et al. | |
| 10,534,525 B1 | 1/2020 | Suchland | |
| 10,872,637 B2 | 12/2020 | Oxholm et al. | |

(Continued)

FOREIGN PATENT DOCUMENTS

EP 2608148 6/2013

OTHER PUBLICATIONS

Huang et al., "Temporally Coherent Completion of Dynamic Video", Nov. 2016, Association for Computing Machinery, Graph., vol. 35, No. 6, Article 196, pp. 11 (Year: 2016).*

(Continued)

*Primary Examiner* — Chan S Park
*Assistant Examiner* — Daniel C Chang
(74) *Attorney, Agent, or Firm* — Kilpatrick Townsend & Stockton LLP

(57) ABSTRACT

One or more processing devices access a scene depicting a reference object that includes an annotation identifying a target region to be modified in one or more video frames. The one or more processing devices determine that a target pixel corresponds to a sub-region within the target region that includes hallucinated content. The one or more processing devices determine gradient constraints using gradient values of neighboring pixels in the hallucinated content, the neighboring pixels being adjacent to the target pixel and corresponding to four cardinal directions. The one or more processing devices update color data of the target pixel subject to the determined gradient constraints.

20 Claims, 7 Drawing Sheets

(56) References Cited

U.S. PATENT DOCUMENTS

| | | | |
|---|---|---|---|
| 10,873,697 | B1 | 12/2020 | Jain et al. |
| 11,081,139 | B2 | 8/2021 | Oxholm et al. |
| 11,756,210 | B2 | 9/2023 | Wang et al. |
| 2006/0257042 | A1 | 11/2006 | Ofek et al. |
| 2008/0112642 | A1 | 5/2008 | Matsushita et al. |
| 2013/0128121 | A1 | 5/2013 | Agarwala et al. |
| 2016/0111129 | A1 | 4/2016 | Crivelli et al. |
| 2017/0228875 | A1 | 8/2017 | Nash et al. |
| 2018/0322672 | A1 | 11/2018 | Shibata et al. |
| 2020/0143541 | A1 | 5/2020 | Wang et al. |
| 2021/0090279 | A1 | 3/2021 | Dekel et al. |
| 2021/0272294 | A1 | 9/2021 | Ling et al. |
| 2021/0374904 | A1* | 12/2021 | Liao ........................... G06T 3/18 |
| 2021/0390697 | A1 | 12/2021 | Marder Gilboa et al. |

OTHER PUBLICATIONS

Gao et al., "Flow-edge guided video completion", Computer Vision-ECCV 2020, Sep. 3, 2020, arXiv:2009.01835v1 [cs.CV] (Year: 2020).*

"Mocha Pro: Object Removal & Clean Plating", Available Online at https://www.youtube.com/watch?v=_OUxcFHGOb8, Feb. 13, 2018, 27 pages.

"Peek Behind the Sneaks: #Project Cloak—Filmmakers Gain the Power of Invisibility", Adobe Blog, Available Online at: https://theblog.adobe.com/peek-behind-sneaks-filmmakers-gain-power-invisibility/, Jan. 10, 2018, 4 pages.

"Project Cloak: Content-Aware Fill for Video", Adobe, Available Online at: https://www.youtube.com/watch?v=Po-TLPnlrIU, Nov. 10, 2017, 18 pages.

U.S. Appl. No. 16/378,906 , "Corrected Notice of Allowability", Jun. 28, 2021, 2 pages.

U.S. Appl. No. 16/378,906 , "Non-Final Office Action", Oct. 28, 2020, 20 pages.

U.S. Appl. No. 16/378,906 , "Notice of Allowance", Mar. 10, 2021, 12 pages.

U.S. Appl. No. 16/585,433 , "Final Office Action", Jul. 24, 2020, 13 pages.

U.S. Appl. No. 16/585,433 , "First Action Interview Office Action Summary", Jul. 28, 2020, 12 pages.

U.S. Appl. No. 16/585,433 , "First Action Interview Pilot Program Pre-Interview Communication", Apr. 29, 2020, 4 pages.

U.S. Appl. No. 16/585,433 , "Notice of Allowance", Aug. 25, 2020, 5 pages.

U.S. Appl. No. 16/817,100 , "Corrected Notice of Allowability", Jul. 26, 2023, 3 pages.

U.S. Appl. No. 16/817,100 , "Final Office Action", Oct. 13, 2022, 35 pages.

U.S. Appl. No. 16/817,100 , "First Action Interview Office Action Summary", Apr. 22, 2022, 10 pages.

U.S. Appl. No. 16/817,100 , "First Action Interview Pilot Program Pre-Interview Communication", Feb. 11, 2022, 8 pages.

U.S. Appl. No. 16/817,100 , "Notice of Allowance", Apr. 21, 2023, 8 pages.

U.S. Appl. No. 17/196,581 , "Non-Final Office Action", Nov. 16, 2022, 13 pages.

U.S. Appl. No. 17/196,581 , "Notice of Allowance", Mar. 8, 2023, 8 pages.

U.S. Appl. No. 17/196,581 , "Notice of Allowance", Jun. 30, 2023, 9 pages.

Gao et al., "Flow-edge Guided Video Completion", European Conference on Computer Vision 2020, Available Online at: http://chengao.vision/FGVC/files/FGVC.pdf, Sep. 3, 2020, 17 pages.

GB1911506.2 , "Search and Examintaion Report", Feb. 19, 2020, 7 pages.

Granados et al., "How Not to be Seen—Object Removal from Videos of Crowded Scenes", Eurographics, vol. 31, No. 2, May 1, 2012, pp. 1-10.

Huang et al., "Temporally Coherent Completion of Dynamic Video", Association for Computing Machinery Transactions on Graphics, vol. 35, No. 6, Nov. 2016, 11 pages.

Kunz , "Cloak: Remove Unwanted Objects in Video", Adobe Research, Available Online at: https://research.adobe.com/news/cloak-removeunwanted-objects-in-video, Dec. 11, 2017, 3 pages.

Ng et al., "Data Compression and Transmission Aspects of Panoramic Videos", IEEE Transactions on Circuits and Systems for Video Technology, vol. 15, No. 1, Jan. 2005, pp. 82-95.

Ruegg et al., "DuctTake: Spatiotemporal Video Compositing", Computer Graphics Forum, Eurographics, vol. 32, No. 2, 2013, 11 pages.

Wexler et al., "Space-Time Completion of Video", Institute of Electrical and Electronics Engineers Transactions on Pattern Analysis and Machine Intelligence, vol. 29, No. 3, Mar. 2007, pp. 1-14.

Xu et al., "Deep Flow-Guided Video Inpainting", Conference on Computer Vision and Pattern, Institute of Electrical and Electronics Engineers, May 2019, 10 pages.

Yu et al., "Free-Form Image Inpainting with Gated Convolution", Available Online at: https://arxiv.org/pdf/1806.03589.pdf, Oct. 22, 2019, 17 pages.

Yu et al., "Generative Image Inpainting with Contextual Attention", In Proceedings of The IEEE Conference on Computer Vision and Pattern Recognition, Mar. 21, 2018, pp. 1-15.

Zhang et al., "Colorful Image Colorization", Available Online at: https://arxiv.org/pdf/1603.08511.pdf, Oct. 5, 2016, 29 pages.

* cited by examiner

CORRECTIVE LIGHTING FOR VIDEO INPAINTING

CROSS-REFERENCE TO RELATED APPLICATIONS

This application is a continuation of U.S. patent application Ser. No. 17/196,581, filed on Mar. 9, 2021, now allowed, the contents of all of which are incorporated herein by reference.

TECHNICAL FIELD

This disclosure relates generally to automated processing of video content for video playback. More specifically, but not by way of limitation, this disclosure relates to corrective lighting for video inpainting using gradient constraints.

BACKGROUND

Certain video editing programs include features for replacing content in a target region with other desired content, such as user-provided content or content that is copied or derived from other regions in the video. For example, video inpainting methods are used to fill spatiotemporal holes in a video with generated content that uses the remaining parts of the video, user input, or data-driven methods trained on other visual content. Video inpainting is used for different applications, such as, but not limited to, unwanted object removal, video stabilization, logo or watermark removal in broadcast videos, and restoration of damaged film content, etc.

SUMMARY

Certain aspects involve video inpainting a target region of a set of video frames using gradient constraints. These gradient constraints are used to estimate pixel colors and gradients within the target region, and thereby, perform video inpainting with respect to the target region. For instance, aspects described herein perform video inpainting using gradient constraints for a target region that more closely matches estimated colors and gradients within the target region. One example method includes one or more processing devices that perform operations that include accessing a scene depicting a reference object that includes an annotation identifying a target region to be modified in one or more video frames. The operations also include computing a target motion of a target pixel that is subject to a motion constraint. The motion constraint is based on a three-dimensional ("3D") model of the reference object. Further, operations include determining color data of the target pixel to correspond to the target motion. The color data includes a color value for each pixel. The color values of neighboring pixels are used to compute a gradient. Operations also include determining gradient constraints using gradient values of neighbor pixels. Additionally, the processing devices update the color data of the target pixel subject to the gradient constraints.

Other aspects described herein perform tasks for video inpainting by interpolating a target motion for a target region using gradient constraints. One computing system includes a processing device and a non-transitory computer-readable medium communicatively coupled to the processing device and storing program code. The processing device is configured to execute the program code and thereby performing operations that include accessing a scene depicting a reference object that includes an annotation identifying a target region to be modified in one or more video frames. Further, operations include computing a target motion of a target pixel that is subject to a motion constraint. The motion constraint is based on a 3D model of the reference object. Additionally, operations include determining color data of the target pixel to correspond to the target motion. The color data comprises a color value and a gradient. Operations further include determining gradient constraints using gradient values of neighbor pixels. The neighbor pixels are adjacent to the target pixel and correspond to four cardinal directions. Operations also include updating the color data of the target pixel subject to the gradient constraints.

These illustrative examples are mentioned not to limit or define the disclosure, but to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

Figure 1:
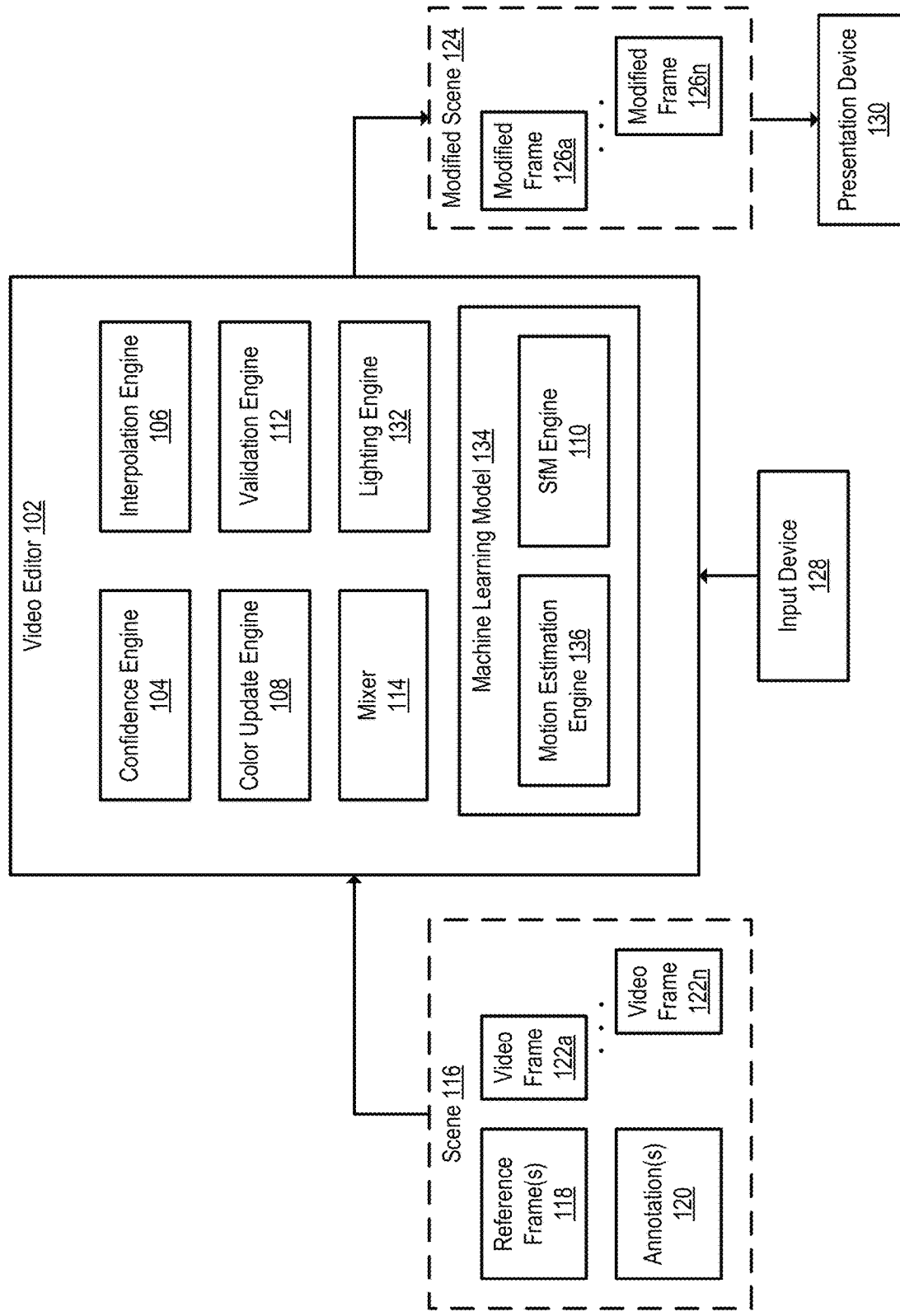
FIG. 1 depicts an example of a video editing environment for video inpainting using gradient constraints, according to certain aspects of this disclosure.

Certain aspects involve video inpainting using motion constraints based on sparse feature points or motion values. For instance, a video editor assists with modifying a target region of a video, which includes portions of video frames depicting an object to be removed or modified, by using the computed motion of a scene depicted in the video frames to identify content to be copied into the target region. This computation of scene motion includes estimating, prior to modifying the target region, what the motion of the scene would be within the target region based on the motion of other pixels in the scene. The video editor propagates color information into the target region based on this estimated motion and in a manner that corrects lighting errors when performing the video inpainting. For example, the video editor uses gradient constraints to account for changes in lighting when modifying the target region. These changes in lighting are caused by, for example, the target region falling into a shadow, effects such as a lens flares, or changes in the overall scene exposure or white balance. In some aspects, the video editor performs the video inpainting in both the gradient domain and in the color domain, thereby correcting for changes in lighting conditions while providing more stable results over time.

The following non-limiting example is provided to introduce certain aspects. In this example, a video editor accesses a set of video frames, such as an input video being modified by a user with the video editor, that depicts a scene. For instance, a depicted scene includes a football game in progress as well as a spectator that disrupts the view of the football game by walking in front of the camera. The set of video frames includes annotations identifying a target region that corresponds to a location associated with the spectator to be modified in the scene. For instance, the video editor receives user inputs that identify the spectator in the set of video frames. In this example, the spectator walks in front of the camera as the lighting changes (e.g., the stadium lights are dimmed, stadium lights are brightened, an amount of sunlight is blocked, or the sunset progresses). As a result, earlier video frames in the video sequence will have a different brightness from subsequent video frames.

In some cases, the user inputs include two-dimensional ("2D") points that are used to identify boundaries of the target region (e.g., boundary points). The user inputs include sparse feature points that identify features that correspond to locations of an object within the target region associated with the spectator. Feature points include characteristics associated with an object that indicate spatiotemporal features associated with the object (e.g., a pixel location, pixel value, pixel intensity, brightness, axis of rotation, relative distance to other feature points (e.g., boundary points), a relationship to a group of pixels or region, etc.).

In some examples, the sparse feature point are 2D sparse feature points or 3D sparse feature points. In additional or alternative aspects, the video editor obtains similar 3D sparse feature points that correspond to locations associated with an object associated with the spectator from a machine learning model. In some examples, the machine learning model includes a structure from motion ("SfM") engine. For instance, a SfM engine provides a 3D reconstruction of a particular object located proximate to the spectator from the set of video frames. The SfM engine performs a process that computes the 3D model of the reference object using changes in a relative position of the particular object (e.g., spatiotemporal changes) across the set of video frames. The video editor uses these boundary points and sparse feature points as inputs to annotate the spectator in the set of video frames that comprise the scene.

Continuing with this example, the video editor identifies a reference frame that has been provided to the video editor via one or more inputs. The reference frame includes one or more reference objects that have been created or selected, automatically or with user input, in the target region. These reference objects are generated by applying a modification to the target region. For instance, in the scene of a football game described above, the video frames might not include a certain portion of the football field, such as the fifty-yard line, because the spectator was between the camera and that portion of the football field for video frames captured by the camera. The video editor is used to recreate the fifty-yard line by mirroring other, similar portions of the football field depicted in the scene (e.g., the thirty-yard line) and refining specific details (e.g., changing a depiction of a "3" to a "5"). The video editor uses an estimated motion of the scene to propagate reference color data from this reference frame to other video frames in the scene. For instance, if the scene depicts the football game behind the spectator, the various objects that comprise the football game (e.g., the field, the players, etc.) moves within the scene due to the movement of the objects themselves when captured (e.g., a player running downfield), the movement of the camera (e.g., panning from one end of the field to the other), changing the zoom on the camera, etc.

To remove the "spectator" object in this example, the video editor estimates the motion within the target region. Estimating the motion includes interpolating, from the boundary motion computed for the boundary pixels, a target motion within the target region, both of which are constrained by sparse feature points of a reference object within the video frames. The estimated motion within the target region is a function of the combined computations of motion for target pixels that must conform in color data and geometric shape to motion constraints provided by the sparse feature points. The video editor uses the interpolated motion to update color data of target pixels within the target region. Updating color data of target pixels within the target region includes updating the target region in a first video frame in accordance with reference color data from the reference frame, based on motion constraints of the sparse feature points, and then propagating this change from the first video frame to a second video frame, from the second video frame to a third video frame, and so on.

As a simplified example, the reference frame depicts a "fifty-yard line" object rather than the "spectator" object that disrupts the scene in other video frames. The target region for "spectator" object includes boundary pixels that follow a path from a first video frame to a video second frame. The video editor interpolates, from the path followed by the boundary pixels, a similar path that would occur for an object the user wishes to insert inside the target region (e.g., the path of the "fifty-yard line" object). In this case, the target region is constrained to the substantially white area of the path within the boundaries of the target region. In addition, some sparse feature points include an axis of rotation associated with the substantially quadrilateral-shaped target region within the boundaries of the "fifty-yard line" object. In one example, an ultra-high-definition ("UHD") video includes unpainted blades of grass within the otherwise mostly white target "fifty-yard line" object. These blades of grass and/or axes of rotation are used by the video editor as motion constraints. The interpolated motion within the target region allows the video editor to estimate where the "fifty-yard line" object would be within the target region, for example, by tracing pixels depicting the "fifty-yard line" object from the reference frame to expected positions in other video frames of the scene.

The video editor then copies the reference color data of the pixels depicting the "fifty-yard line" object from the reference frame to a first video frame that has the target region annotated. In some cases, the video editor modifies the copied color data for consistency with color data outside the target region. For instance, if the reference frame depicts a scene from a view at one angle and the first video frame depicts the scene from a slightly different view at a different angle, the video editor modifies the copied version of the "fifty-yard line" object so that the "fifty-yard line" object appears to be captured from the same view as the rest of the scene in the first video frame. The video editor replicates this process for subsequent video frames. For instance, the video editor copies color data of the "fifty-yard line" object from the first video frame to the target region a second video frame, and modify the "fifty-yard line" object in the second video frame for consistency with other color data outside the target region in the second video frame. Similarly, the video editor copies the "fifty-yard line" object from the second video frame to a third video frame and performs any necessary modifications.

For instance, the "fifty-yard line" object mentioned above includes UHD blades of grass or a particular axis of rotation that requires different color data. The video editor copies the "fifty-yard line" object, subject to these motion constraints, and thereby modify the "fifty-yard line" object to include the UHD blades of grass or an axial rotation. In certain cases, the video editor determines that a nearby 3D object or a sub-region of the "fifty-yard line" object requires modification. Such a 3D "yardage marker" object, corresponding to the "fifty-yard line" object, requires modification to ensure the 3D "yardage marker" object does not appear with a geometric distortion (e.g., a parallax effect, pulling effect (e.g., a stretched background image), perspective distortion, warp, axial rotation, radial distortion, barrel distortion, pincushion, asymmetry, compression, elongation, texture gradient, image gradient, etc.).

Once the updated color data is obtained using the estimated motion, the video editor then corrects any lighting issues that occurred during the update. For example, the video editor applies localized, corrective lighting changes to correct for shadows cast by the spectator. In other examples, the video editor applies corrective lighting changes that are caused by a functionality of the camera. For instance, the video editor applies corrective lighting changes that are caused by automatic aperture adjustments or white-balancing. The video editor continues this process for other video frames depicting the scene, thereby replacing the disruptive "spectator" object in the video with a user-created "fifty-yard line" object.

The video editor uses corrective lighting techniques described herein to correct these lighting issues. In one example, the video editor executes a lighting engine that uses color data and the motion constraints described above to determine one or more gradient constraints. The lighting engine uses these gradient constraints to smooth any errors that were caused by lighting changes over time. As a result, the lighting engine generates a corrected image that depicts the "fifty-yard line" and is integrated in a modified frame as a smooth, contiguous surface of the football field.

As described herein, certain aspects provide improvements to computing systems used for editing video content. For instance, existing video inpainting techniques fill a selected portion of a video frame (e.g., a hole or target region where an object was removed) with content sampled from other parts of the video frame. But for video frames that depict more complex, 3D, partially occluded, or fully occluded objects (e.g., a hole or target region in the middle of a 3D object with detailed features or large variation in color), these automated techniques often introduce inaccuracies in the filled-in region (e.g., invalid pixels, parallax effects, or visually distorted objects), and propagating this inaccurately filled-in region across a video leads to an accumulation of errors.

Further, some existing video inpainting techniques cause an accumulation of errors that often induces a flicker, which, in time, grows as the errors inherent in a multi-source gradient field cannot be properly integrated. For instance, existing video inpainting techniques commonly use gradient domain compositing to blend two images and/or videos together. Many of these existing techniques attempt to perform video inpainting entirely in the gradient domain. In traditional gradient compositing, there is only one source of gradient information—an image gradient obtained from a single region of an existing image or video frame.

Traditional gradient compositing uses this one image gradient to solve Poisson's equation to paint a new image that produces a new image to approximate the desired gradient. For example, traditional single-image Poisson blending of pixels only uses two constraints: a horizontal constraint (comparing the pixel and its east neighbor) and a vertical constraint (comparing the pixel to its south neighbor). Further, in traditional Poisson blending, adding additional any constraints would be redundant (e.g., adding a constraint to the west, would merely be the same constraint as its east neighbor). This causes an accumulation of errors that is distributed in such a way that is not easy to see in a single frame, but this accumulation of errors causes a perceptual and/or flickering effect that corresponds to the in-filled region and is visually obvious during playback of the video. Additionally, by blending pixels within each video frame independently, traditional Poisson blending causes a resulting video to include erroneous changes in brightness that become noticeably perceptible during a sequential playback of the independently-blended video frames (e.g., during a full video playback).

By contrast, certain aspects described herein reduce the amount of error in a video inpainting process. For instance, by inserting a reference frame into locations in a sequence of video frames that are constrained by gradients, a more accurate (e.g., a more temporally consistent or stable) version of such a filled-in region is used as the basis for an automated video inpainting process in other video frames of the video by maintaining a lighting integrity of the reference object. The lighting integrity of the reference object, within the filled-in region, is maintained by applying motion constraints to the reference object, thereby ensuring an accurate perspective (e.g., color, shape, orientation) of the reference object based on spatial-temporal relationships between the sparse feature points of the reference object. Consequently, the color information propagated from the filled-in region to other video frames more realistically depicts a desired scene (e.g., a scene in which a target object has been removed).

Additionally, instead of merging two consistent regions together (causing inconsistencies to arise on the border), certain aspects described herein reduce the errors in a video inpainting process by building a dense field of gradients and colors from a combination of input video frames. Further, certain aspects create a gradient field that produces errors throughout the video inpainting process, including when solving the Poisson equation to recover underlying color data (e.g., color data associated with a motion constraint). The errors produced during the video inpainting process necessitate combining both gradient and motion constraints. To do so, a hole region of a single frame is filled with information from a number of different video frames. In some cases, the hole region is filled with information from dozens of video frames. As a result, the video inpainting combines gradient and motion constraints in a way that reduces the perceptual effect of lighting change, while also avoiding a perceived amount of temporal flickering. Thus, aspects described herein improve computer-implemented processes performed by video-editing tools.

Example of an Operating Environment for Video Inpainting Via Reference Frames

Referring now to the drawings, FIG. 1 depicts an example of a video editing environment 100 for performing video inpainting with user-provided reference frames. Video inpainting methods involve filling target regions in a video with content from other parts of the video, content provided via user input, or content generated via data-driven methods trained on other visual content. The video editing environment 100 includes a set of communicatively coupled video editing components. These components (e.g., video editing tools) include a video editor 102 that is executed on one or more computing devices, an input device 128 that is used to provide commands to the video editor 102, and a presentation device 130 that displays video content to a user.

The video editor 102 includes program code for displaying and editing video content. For instance, the video editor 102 includes program code for rendering content for display, program code for creating instances of event listeners or other suitable objects for receiving input from input devices (e.g., input device 128, a mouse, a touchscreen, etc.), and program code for modifying color information for pixels in frames of video content, etc.

In the example depicted in FIG. 1, the video editor includes a confidence engine 104, an interpolation engine 106, and a color update engine 108. The confidence engine 104 includes program code that, when executed by processing hardware, performs one or more operations for computing one or more measures of confidence in motion estimations performed by the video editor 102. The interpolation engine 106 includes program code that, when executed by processing hardware, performs one or more operations for estimating the motion of pixels bordering a user-specified area of interest across a set of video frames. The interpolation engine 106 includes program code that, when executed by processing hardware, performs one or more operations for estimating the motion of pixels within the user-specified area of interest across a set of video frames 122a-122n. The color update engine 108 includes program code that, when executed by processing hardware, performs one or more operations for modifying color information within the user-specified area of interest based on the estimated motion.

In one example, the video editor 102 executes the confidence engine 104. The confidence engine 104 computes an optical flow with respect to a set of video frames that collectively depicts the scene 116. For instance, the video frames are included in an input video I of height H, width W and number of video frames L. The video editor 102 computes a forward flow U and a backward flow V. To compute the motion between video frame n and n+1, the video editor 102 computes the flow (motion) from time n to time n+1. The forward flow at position (x,y,n) (e.g., a pixel at position (x,y) on a video frame at time n) is represented as U (x,y,n)=(dx, dy, +1), indicating a flow vector (dx, dy) from a point located at (x,y, n) to a point (x+dx,y+dy,n+1) in the video I. The backward flow at position (x,y,n) (e.g., a pixel at position (x,y) on video frame n) is represented as V (x, y, f)=(dx, dy, −1).

In this example, a boundary motion includes a motion with respect to one or more pixels that define a boundary of a target region. One example of a boundary includes a set of pixels that neighbor the union of the hole in a video frame n and a video frame n+1. This set of boundary pixels includes pixels having some commonality with one another that are adjacent to at least one other pixel not sharing the commonality (e.g., two pixels that share at least some color information and that have no common color information with respect to an adjacent pixel in the target region).

The interpolation engine 106 computes, based on the boundary motion, an estimated motion with respect to the target region. For instance, each boundary pixel is associated with a respective boundary motion represented by a vector. The interpolation engine 106 uses the collection of vectors to compute an estimated motion for a target pixel within the target region. The video editor 102 can also compute or obtain confidence values for motion values around the boundary of the target region. In some aspects, the video editor 102 can compute or obtain confidence values for motion values within the target region. The video editor 102 can use confidence values for motion around and/or within the target region to interpolate the motion within the target region. The interpolation engine 106 generates a modified motion field that includes a motion vector for the estimated motion, along with the vectors for the boundary pixels in the motion field.

Further, the confidence values can be used to control how the observed motion of certain pixels associated with a given object outside a target region (e.g., boundary pixels) is used to estimate un-observed motion within the target region. For instance, a moving scene could depict a target object, which is to be removed, occluding another object, which the user does not wish to remove. The movement of the occluded object through the target region can be considered un-observed because, in the frames depicting the target object moving in front of the second object, the movement of the occluded object is not depicted. Since the motion of the occluded object is un-observed, the interpolation engine 106 performs an operation that estimates the motion of the occluded object by interpolating the motion at the boundary $B_i=(x_i, y_i)$ into the target region.

In some examples, the interpolation engine 106 generates a modified motion field for a specific video frame (i.e., estimates the motion of a pixel in the target region of a specific frame) as a function of (i) the motion of the boundary pixels at the boundary of the target region (ii) the confidence values assigned at block 606. For instance, the interpolation engine 106 computes the motion of a pixel using the following formula: $U(x_j,y_j,n)=f(U(B)$, confidence $(B))$. In this formula, $U(B)$ is used as a shorthand for $U(B_1),U(B_2), \ldots, U(B_k)$, and confidence(B) is used as shorthand for confidence($B_1$), confidence($B_2$), ... confidence($B_k$).

In some aspects, the color update engine 108 performs a pixel-replacement operation or other color-modification operation with respect to the target region (e.g., a hole region indicated in an annotated frame. For instance, the color update engine 108 can identify one or more reference objects (e.g., replacement objects) in the scene that are depicted in one or more reference frames. In this example, the color update engine 108 identifies pixels included in the reference object that is depicted in the scene, where frames before or after a current frame depict the reference object without the object that is to be removed. The interpolated motion computed with the interpolation engine 106 allows the color update engine 108 to modify the pixel color information in the target region (e.g., the hole region) while maintaining a consistent appearance of the replacement objects between frames.

The color update engine 108 modifies pixels within the hole region to have the color information from the identified pixels included in the reference object. By doing so, the color update engine 108 generates a modified frame, where the removed object no longer appears and the hole region has been modified to depict the reference object that was occluded by the removed object. In some aspects, if one or more objects behind the removed object are not depicted in other frames of the scene, the video editor 102 can use a content-aware fill algorithm to guess what is missing.

In the example depicted in FIG. 1, the video editor 102 also includes a machine learning model 134. The machine learning model 134 uses one or more suitable deep learning techniques. Examples of suitable deep learning techniques include techniques using a deep neural network (e.g., Flow-FillNet, deep flow completion network ("DFC-Net"), alternating direction method of multipliers ("ADMM") network, etc.), a convolutional neural network (e.g., a region convolutional neural network ("R-CNN"), Fast R-CNN, or Faster R-CNN), a deep residual network (e.g., ResNet-101), etc. The machine learning model 134 includes a motion estimation engine 136, a color update engine 108, and a SfM engine 110. In some examples, the machine learning model 134 includes a color update engine 108 and/or lighting engine 132.

The motion estimation engine 136 includes program code that, when executed by processing hardware, performs operations for estimating (e.g., interpolating) a target motion of pixels bordering a target region across a set of video frames. The target motion of pixels associated with an object or region within a set of video frames includes an optical spatiotemporal flow that occurs behind a masked region (e.g., the target region) over a duration of time. The motion estimation engine 136 also includes program code that, when executed by processing hardware, performs operations for estimating the motion of pixels within the target region across a set of video frames (e.g., video frames 122a-122n).

The motion estimation engine 136 computes (e.g., interpolates) motion vectors of objects of the scene 116 depicted in the set of video frames 122a-122n. The motion estimation engine 136 also assigns a motion value to the motion vectors of the objects. The motion value indicates a relative or scaled velocity or acceleration of an object, a boundary of the object, or a sparse feature point of the object. In some examples, sparse feature points are user-specified via user inputs. In additional or alternative aspects, the video editor 102 obtains sparse feature points from a 3D reconstruction of a reference object. The machine learning model 134, motion estimation engine 136, or other suitable program code is used to create a 3D model.

In some aspects, the target region is automatically generated by the machine learning model 134. In some aspects, the target region is obtained by user inputs that specify parameters of the target region (e.g., boundary points, a target object within the target region to be replaced, a feature of a target object within the target region, etc.). In some aspects, the motion estimation engine 136 uses sparse feature points associated with reference objects as constraints to reduce geometric distortions within the target region. Using interpolative data without any sparse feature points often result in geometric distortions (e.g., only using boundary points associated with a target object). Instead, the motion estimation engine 136 uses sparse feature points to avoid geometric distortions such as parallax or pulling effects, perspective or radial distortions, warping, axial rotations, asymmetries, compressions, etc.

In some aspects, a user input includes tracing or outline a portion of a particular video frame (e.g., a first video frame 122a) corresponding to a target object. In additional or alternative aspects, the user input indicates a location corresponding to the target object to be removed. Having received a location associated with a target object, the video editor 102 or another suitable program code automatically selects, auto-traces, encapsulates, quantizes, vectorizes, highlights, or otherwise identifies a target region corresponding to the target object. In one example, the video editor 102 traces the target object by circumscribing the object to generate a target region.

In some aspects, interpolating a first target motion of target pixels within the target region from the boundary motion. For instance, the motion estimation engine 136 generates a modified motion field for a specific video frame (e.g., estimates the motion of a pixel in the target region of a specific video frame) as a spatiotemporal function of the motion of the boundary pixels at the boundary of the target region. Further, in some aspects, the video editor 102 computes a boundary motion for one or more boundary points associated with a target region indicated by an annotation (e.g., annotation 120) associated with the scene 116.

The color update engine 108 includes program code that, when executed by processing hardware, performs operations for modifying color information within the target region based on the estimated motion. The color update engine 108 obtains a target motion of pixels associated with an object or region from the motion estimation engine 136. In some aspects, the color update engine 108 uses constraints, such as boundary points or sparse feature points associated with a reference object, to provide pixel information (e.g., a pixel value) for target pixels in a target region. For instance, the color update engine 108 uses a target motion of target pixels provided by the motion estimation engine 136 to determine pixel values associated with a reference object selected to replace a target object. The color update engine 108 modifies a pixel value based on the target motion of the target pixels by determining whether a given pixel location corresponds to a region within or outside of the reference object.

In some aspects, the color update engine 108 performs a pixel replacement operation or other color-modification operation with respect to a hole region. For instance, the color update engine 108 identifies replacement objects that are depicted within the scene 116, appearing in video frames temporally located prior to a first video frame of a set of video frames 122a-122n, subsequent to the first video frame, or both. In some aspects, a replacement object is obtained from a reference frame (e.g., reference frame 118). Similarly, the color update engine 108 modifies a pixel value based a viewing angle, a presence of another object, or an object's partial or full occlusion. In some aspects, the color update engine 108 modifies pixel values based on sparse constraints, altering pixel values to conform with geometric shapes obtained from the motion estimation engine 136.

The SfM engine 110 includes program code that, when executed by processing hardware, performs operations for providing sparse feature points for a 3D reconstruction of a reference object within the target region based on the estimated motion. In some aspects, the SfN engine 110 obtains user inputs that correspond to 2D features identified from a user input. The SfN engine 110 copies these 2D features and annotate a target region with the 2D features across the set of video frames (e.g., with annotations 120). In some aspects, the SfM engine 110 detects and maps 3D features.

For instance, the SfM engine 110 includes program code that estimates 3D structures across the set of video frames by using a regional motion detection algorithm or other 3D reconstruction technique (e.g., COLMAP, simultaneous localization and mapping ("SLAM"), edge detection, corner points, scale-invariant feature transform ("SIFT"), speeded-up robust features ("SURF"), random sample consensus ("RANSAC"), etc.) In some aspects, the SfM engine 110 maps 3D features to create a 3D pixel map. In some aspects, the 3D pixel map includes a 2D bitmap with different coded values representative of particular color depth values (e.g., grayscale values) and/or coordinate locations. In some aspects, the 3D pixel map includes voxels that represent volumetric relationships within a 3D image.

For example, the 3D pixel map includes voxels in a voxel map includes relative positions of 3D voxels based on regularly sampled values, a homogeneously-filled space, or a non-homogeneously-filled space. The SfM engine 110 provides such sparse feature points to the motion estimation engine 136, color update engine 108, or both. In some aspects, the SfM engine 110 provides such sparse feature points via color maps corresponding to objects within a reference frame 118. In some aspects, the motion estimation engine 136 and/or color update engine 108 uses sparse feature points as motion constraints associated with the target region.

The lighting engine 132 includes program code that, when executed by processing hardware, performs operations for modifying color information within the target region based on the estimated motion and one or more gradient constraints. The lighting engine 132 obtains a target motion of pixels associated with an object or region from the motion estimation engine 136, color information from the color update engine 108, and/or motion constraints from the SfM engine 110. In some aspects, the lighting engine 132 also uses motion constraints, such as boundary points or sparse feature points associated with a reference object, to provide pixel information (e.g., a pixel value) for target pixels in a target region.

For instance, the lighting engine 132 uses a target motion of target pixels provided by the motion estimation engine 136 to adjust pixel values associated with a reference object selected to replace a target object. The lighting engine 132 modifies a pixel value based on the target motion of the target pixels by determining whether a given pixel location corresponds to a region within a gradient of the reference object. Similarly, the lighting engine 132 modifies a pixel value based a viewing angle, a presence of another object, an object's partial or full occlusion, a light source, a gradient of a neighbor pixel, etc. In some aspects, the lighting engine 132 modifies pixel values based on sparse constraints, altering pixel values to conform with geometric shapes obtained from the motion estimation engine 136, the color update engine 108, the SfM engine 110, or the machine learning model 134.

The video editor 102 also includes a validation engine 112. The validation engine 112 includes program code that, when executed by processing hardware, performs operations for validating the motion estimation and updated colors of pixels associated with a target region across a set of video frames. In some aspects, the validation engine 112 performs substantially similar computations to those described above with respect to the machine learning model 134. For example, the validation engine 112 randomly selects two sequential video frames to determine a target motion of target pixels within a target region to validate a result produced by the machine learning model 134. In some aspects, the validation engine 112 computes a target motion of target pixels in a backwards or reverse temporal order. For instance, the validation engine 112 selects two or more video frames of a set of video frames and determines a target motion of target pixels in both forward and reverse temporal orders.

In the example video editing environment 100, the video editor 102 also includes a mixer 114. The mixer 114 includes program code that, when executed by processing hardware, performs operations for generating motion videos having inpainted target regions using a combination of information obtained from the motion estimation engine 136 and the color update engine 108 across a set of video frames. The image mixer 114 combines the abovementioned information to arrange and generate images depicting the inpainted target regions within each video frame of the set of video frames. The image mixer 114 outputs the generated images (e.g., modified scene 124) to one or more computing devices. It should be appreciated that the image mixer 114 generates the images by blending, layering, overlaying, merging, slicing, or any other suitable audio visual integration technique.

While FIG. 1 depicts a video editor 102 that includes a confidence engine 104, an interpolation engine 106, and a color update engine 108, a machine learning model 134 (having a motion estimation engine 136 and a SfM engine 110), a validation engine 112, a mixer 114, and a lighting engine 132 other implementations are possible. For instance, in various aspects, one or more of these engines are omitted, the functionality of these engines are combined into a single software engine, or these engines are included in software that is separate from and in communication with the video editor 102. The confidence engine 104, interpolation engine 106, and color update engine 108, for example, may be omitted. In other examples, the machine learning model 134, motion estimation engine 136, SfM engine 110, validation engine 112, and/or mixer 114 may be omitted.

The video editor 102 is used to remove or modify one or more objects or other features in video content using one or more user-provided reference frames 118. (An example of using motion information is discussed below with respect to FIGS. 4-5, and an example of object modification is discussed below with respect to FIGS. 6-9). Video content includes, for example, the scene 116 that includes a sequence of video frames 122a through 122n.

Examples of removing or modify objects or other features include removing people or large objects (for color grading, or producing 3D films), removing dark areas in the video resulting from dust on a lens of a camera, removing unwanted objects (trash, accidental set element), removing logos (for stock video or commercialization), removing distractors (labels, artifacts, lint, dust, a visual distortion, a scratch mark on a lens, etc.), changing appearance of something in a video by modifying only one video frame or a small set of video frames, etc. In some aspects, removing or modify objects or other features includes objects or features that appear during camera movements. In addition to panning mentioned above, objects or features appear in video frames of the scene 116 during camera movements that include zooming, tilting, dollying, trucking, crane shots. In some aspects, objects appear in video frames of the scene 116 based on a focal point or point of view associated with a direction corresponding to a camera angle that is dictated by camera position.

In an illustrative example, the video editor 102 fills a target region, such as a hole region, in a set of video frames. A hole region is a contiguous collection of pixels in the image that are transparent or semi-transparent (e.g., translucent, having some level of opacity, or being partially opaque or occluded). In some aspects, a hole region is a target region or a sub-region of a target region. For instance, a sub-region includes a part of a target region that represents an embedded portion of a target region (e.g., a watermark). In some aspects, a sub-region includes an equally-apportioned visual area (e.g., a quartile). And in some aspects, a sub-region corresponds to a feature region, such as a sub-region corresponding to a face of a person that is a target within a corresponding target region.

In this example, the video editor 102 receives, from the input device 128, user input that adds one or more annotations 120 to the video frames 122a-122n. An annotation 120 is data that is included in or associated with video content to identify the target region in the set of video frames 122a-122n. In some aspects, the video editor 102 propagates such an identification with the annotation 120 that is associated with instructions for removal of a depicted object. For instance, in some examples, the annotation 120 is a mask or other data that segments a target object from other objects in a video frame. In one example, the user input includes drawing a rough mask around a target object in one or more video frames (e.g., tracing or rotoscoping the target object), where the one or more objects indicated by the mask are tracked over a sequence of video frames (e.g., over a duration of time). In some aspects, the video editor 102 in-fills target regions using selected keyframes in a set of video frames.

Continuing with this example, the video editor 102 applies, responsive to one or more command inputs received via the input device 128, a video inpainting process to generate or otherwise identify target pixel data (e.g., location, pixel value, grayscale value, intensity, other color information, format, type, layout, etc.). The target pixel data is used to modify the target region. In particular, the video editor 102 modifies color information of pixels in the target region using the target pixel data.

For instance, the video editor 102 copies color information from pixels in the reference frame 118 to certain pixels of a video frame (e.g., video frame 122b). In some aspects, the video editor 102 modifies the color information in the video frame 122b so that the appearance of a reference object (e.g., the object comprising reference pixels with copied color information) in the video frame 122b is consistent with other objects depicted in a first video frame 122a. As a simplified example, the reference frame 118 depicts a target region within a scene 116 from a certain viewing angle, whereas the video frame 122b depicts the target region in the scene 116 from a different viewing angle. Thus, simply copying a reference object (e.g., color information in one or more reference pixels) from the reference frame 118 to the video frame 122b results in the reference object within video frame 122b having an angle that differs from the rest of the scene 116 in the video frame 122b. To avoid this result, the video editor 102 modifies the color information copied from the reference frame 118 so that the reference object, as depicted in the video frame 122b, appears consistent with other objects in the video frame 122b having the same viewing angle. The video editor 102 similarly copies (and, if necessary, updates) color information from pixels in the video frame 122b to pixels of a subsequent one of the video frames. (The pixels that are updated in each video frame are identified using an estimated motion of a scene (e.g., scene 116), as described in further detail below with respect to FIGS. 2-9.) In this manner, the video editor 102 generates a modified scene 124, having modified frames 126a-126n, for display on the presentation device 130.

Examples of Processes for Video Inpainting with Corrective Lighting

Figure 2:
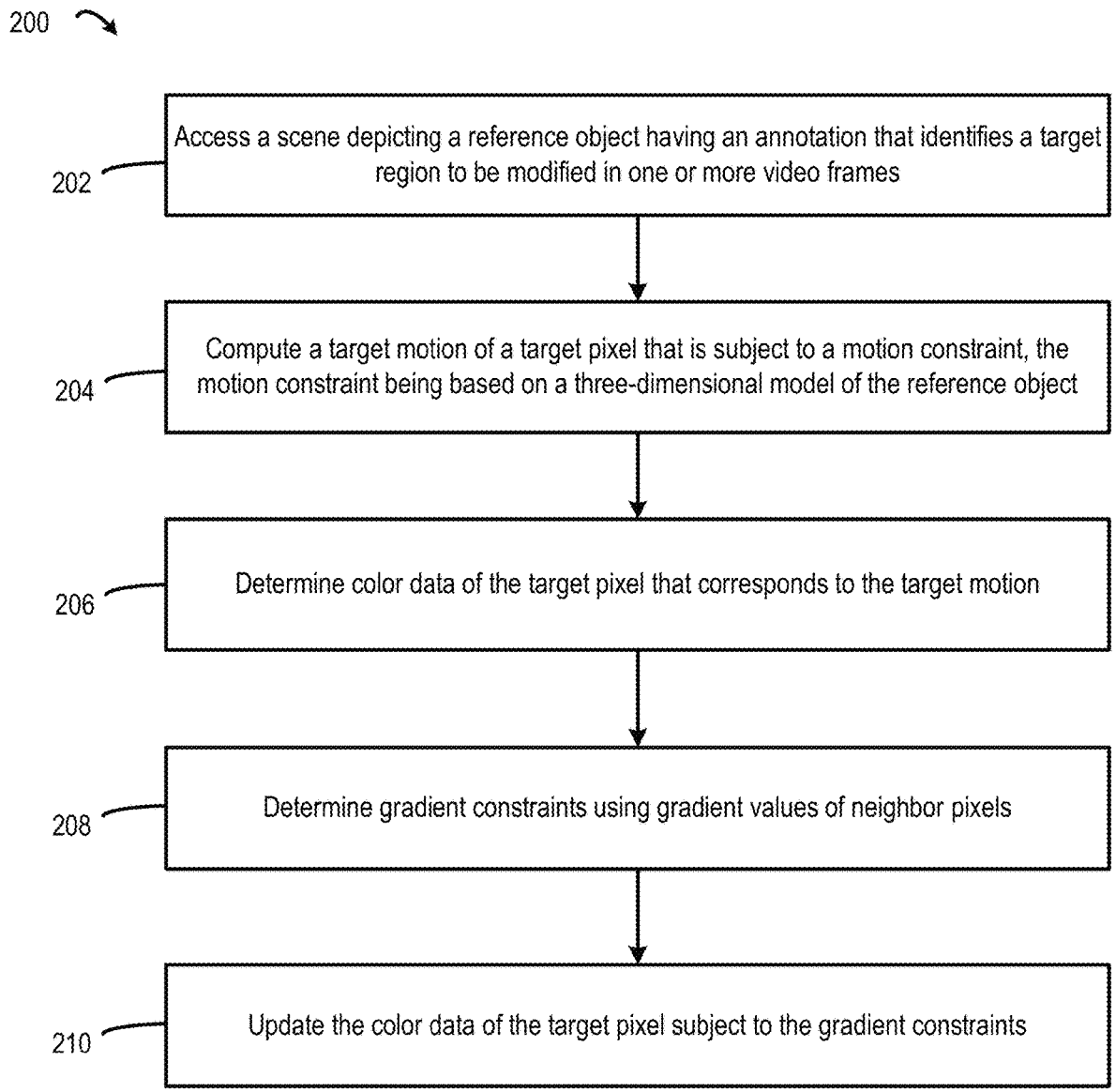
FIG. 2 depicts an example of a process for video inpainting using gradient constraints, according to certain aspects of this disclosure.

FIG. 2 depicts an example of a process 200 for performing video inpainting using motion constraints, according to certain aspects of this disclosure. One or more operations described with respect to FIG. 2 is used to implement a step for corrective lighting within a scene (e.g., scene 116) based on a target motion of a target pixel subject to motion constraints and gradient constraints. In some aspects, one or more computing devices implement operations depicted in FIG. 2 by executing suitable program code (e.g., the video editor 102, one or more of the engines depicted in FIG. 1, etc.). For illustrative purposes, the process 200 is described with reference to certain examples depicted in the figures. Other implementations, however, are possible.

At block 202, the process 200 involves accessing a scene that includes video frames depicting a reference object having an annotation that identifies a target region to be modified. A set of sparse feature points are computed from changes in position of the reference object across video frames that comprise the scene 116. The scene 116 is accessed at block 202 and includes an annotation (e.g., annotation 120) that identifies a target region to be modified. The video editor 102 accesses video content from a data storage unit. The data storage unit is located on one or more memory devices available over a data network, connected to a data bus on a computing device that executes video editor 102, or some combination thereof.

In one example, the video editor 102 accesses video content having one or more annotated target regions. Examples of an annotated target region include a hole generated by one or more erasure inputs received via the input device 128, a particular target object to be replaced (e.g., a stick figure depicted in FIG. 4, described below) that is identified by one or more selection inputs received via the input device 128 as a particular target object to be modified (e.g., modifying the appearance of a target object rather than removing the target object) that is identified by one or more selection inputs received via the input device 128, a dark area in the scene 116 that is generated by dust on the lens of a camera used to capture the scene, or a shadow to be removed. The video editor 102 is used to modify some or all pixels in the hole with color values. For instance, if an object is to be removed or a hole to be filled, the video editor 102 is used to modify target pixels in the target region to have color information that would have resulted from capturing the scene 116 without the object.

At block 204, the process 200 involves computing a target motion of a target pixel that is subject to a motion constraint. The motion constraint is based on a 3D model of the reference object. In one example, the video editor 102 extrapolates a set of sparse feature points corresponding to a target motion of the target pixels within the target region. For instance, the video editor 102 receives one or more sparse feature points identified as 3D features points associated with the reference object. In some aspects, the SfM engine 110 performs a 3D reconstruction of video frames to obtain one or more sparse feature points associated with the reference object. The video editor 102 generates a constrained, modified video frame (e.g., modified frame 126a) based on the first target motion and the sparse feature points obtained from a user or from a SfM engine 110. The video editor 102 alters erroneous interpolative data within the modified motion field to correct geographic or pixel values that would otherwise cause visual distortion within the target region. In some aspects, the video editor 102 propagates these corrective measures across the set of video frames as a spatiotemporal function of the motion of the boundary pixel locations at the boundary of the target region, sparse pixel locations corresponding to 3D feature points within the target region, or both.

In one example, the motion estimation engine 136 generates a modified motion field for a specific video frame (e.g., estimates the motion of a pixel in the target region of a specific video frame) within the target region from the boundary motion. In one example, the motion estimation engine 136 computes the target motion as a function of the motion of the boundary pixels at the boundary of the target region. In another example, the motion estimation engine 136 computes the target motion as a function of both the motion of the boundary pixels and one or more motion constraints (e.g., a set of sparse feature points).

In some aspects, computing the target motion involves inserting the reference frame 118 that has a modification into the set of video frames in response to an input. The video editor 102 identifies the reference frame 118 that has been provided to the video editor 102 via the input. The reference frame 118 includes one or more reference objects that have been created, with the one or more inputs, for the target region. The modification to the target region includes creating such reference objects. A reference object includes one or more pixels (e.g., a reference pixel) that include reference color data. The video editor 102 modifies the target region in other video frames to include the reference color data from the reference frame 118.

At block 206, the process 200 involves determining color data of a target pixel that corresponds to the target motion. The color data includes a color value. In some examples, the color data includes the color value and a gradient. In this example, video editor 102 determines color data of a target pixel with color data from the reference frame 118 to correspond to the target motion interpolated from the boundary motion. The video editor 102 uses motion fields that have been modified with interpolated target motion of various pixels to trace paths of the pixels from a location within the target region to one or more locations outside the target region. For each pixel in the target region of a given video frame, the video editor 102 copies (and, in some cases, further updates) pixel data (e.g., color information) from a corresponding pixel that has been traced to another video frame.

In a simplified example, the color update engine 108 identifies reference color data of the target pixel at a reference location in the reference frame 118. The color update engine 108 updates first color data of the target pixel at a first location in the first video frame by replacing the first color data with the reference color data. Replacing the first color data with the reference color data includes copying the reference color data, updating the copied reference color data to reflect one or more changes in the scene 116 from the reference frame 118 to the first video frame, and updating the target pixel to have the updated reference color data. Similarly, the color update engine 108 identifies this color data of the target pixel at the first location in the modified first video frame. The color update engine 108 updates second color data of the target pixel at a second location in the second video frame by replacing the second color data with the identified color data of the target pixel in the first video frame. Here, replacing the second color data with the identified color data of the target pixel in the first video frame includes copying color data of the target pixel in the first video frame, updating the copied color data to reflect changes in the scene 116 from the first video frame 122a to the second video frame 122b, and updating the target pixel in the second video frame 122b to have this updated version of the color data of the target pixel in the first video frame 122a.

In this example, the video editor 102 computes an optical flow with respect to the set of video frames that collectively depicts the scene 116, which includes a motion field for an input video and its video frames. For instance, the motion field provides a forward path from any pixel p inside the hole (represented by the expression $p=(p_x, p_y, p_t)$) to a forward-flow-traced spatial-temporal position (represented by the expression $F(p)=(f_x, f_y, f_t)$). In this example, p is a target pixel that corresponds to a location $(p_x, p_y)$ at a time $p_t$, and the spatial-temporal position F(p) corresponds to a forward-flow-traced location $(f_x, f_y)$ at a time $f_t$.

The forward path that defines a forward-flow-traced spatial-temporal position F(p) is determined such that the time $f_t > p_t$ is outside the hole at a later time in the input video. Similarly, the motion field provides a backward-flow-traced spatial-temporal position $B(p)=(b_x, b_y, b_t)$, where B(p) corresponds to a backward-flow-traced location $(b_x, b_y)$ at a time $b_t < p_t$ for a previous video frame in the input video. In this example, the backward-flow-traced spatial-temporal position B(p) is used as a reference portion (e.g., as a R(p)). In some examples, both of a R(p) and a F(p) are not available for the target pixel. In such a case, a motion path of the target pixel is "isolated" because it does not leave the hole region.

The video editor 102 computes a set of forward reference positions F and a set of backward reference positions B. Further, the video editor 102 uses the full set of forward reference positions F and backward reference positions B to determine color values for each hole pixel. In some examples, the full set of forward references F and backward reference positions B includes multiple forward-flow-traced positions f and backward-flow-traced positions b, respectively. For instance, the video editor 102 calculates color values of a target image T using an input video frame V (x, y, t), which includes extracted color values for the input video frame V at a time t and a location (x, y). In this example, the color value of the target pixel p in the target image T is computed using the following expression.

$$T(p_x,p_y,p_t)=\text{mix}(V(b_x,b_y,b_t),V(f_x,f_y,f_t))$$

Here, mix $(V(b_x, b_y, b_t), V(f_x, f_y, f_t))$ represents a mixing function combines the color values for a backward-flow input video frame $V(b_x, b_y, b_t)$ at a time $b_t$ and a location $(b_x, b_y)$ with a forward-flow input video frame $V(f_x, f_y, f_t)$ at a time $f_t$ and a location $(f_x, f_y)$. In some examples, the mixing function combines the color values by averaging the color values. In other examples, the mixing function uses a weighted average to determine the color values, for example, by applying a weight to increase a value of a color that is temporally closer to a time associated the target video frame (e.g., the time $p_t$).

At block 208, the process 200 involves determining gradient constraints using gradient values of neighbor pixels. In some examples, the video editor 102 executes lighting engine 132 to determine gradient constraints. In this example, the video editor 102 uses the estimated target motion of the target pixel and the color data of the target pixel, from blocks 204 and 206, respectively, to determine the gradient constraints. The video editor 102 uses gradient constraints from any number of different video frames. In some examples, the video editor 102 uses any number of gradient constraints from each of the different video frames.

In one example, the video editor 102 uses gradient constraints that are derived from multiple neighboring pixels (e.g., adjacent to the target pixel) that are obtained from different video frames. For instance, the video editor 102 uses gradient constraints from four neighbor pixels. In this example, the four neighbor pixels correspond to four cardinal directions (e.g., north ("N"), south ("S"), east ("E"), and west ("W") directions). In some examples, the video editor 102 uses multiple gradient constraints in each of the four directions. For instance, in some examples, the video editor 102 adds two units in each of the four cardinal directions, generating a total of eight gradient constraints. Further, in some examples, the video editor 102 adds two units in four cardinal directions, each unit having a forward-flow-traced position and backward-flow-traced position, in order to generate a total of sixteen total gradient constraints.

In some examples, the four cardinal directions are relative directions, including up, down, left, and right. In other examples, a 3D model is used, and the cardinal directions include north ("N"), south ("S"), east ("E"), and west ("W") directions. Further, in some examples, the cardinal directions include intercardinal directions (e.g., intermediate or ordinal directions such as northeast ("NE"), southeast ("SE"), southwest ("SW"), and northwest ("NW")), secondary intercardinal directions (e.g., north-northeast ("NNE"), east-northeast ("ENE"), east-southeast ("ESE"), south-southeast ("SSE"), south-southwest ("SSW"), etc.). And, in some examples, the four cardinal directions include one or more pairs of pixels having oppositional positions, for example, where the pixels correspond to relative directions in opposition from one another.

Continuing with this example, the video editor 102 computes a constraint to the east of the target pixel. The video editor 102 uses the forward reference of the target pixel p to obtain the forward-directional east gradient constraint, using the following expression.

$$w_{grad}(f,1,0) \cdot w_{channel}(f,1,0) \cdot \|(V(f_x,f_y,f_t)-V(f_x+1,f_y,f_t))-T(p_x,p_y,p_t)-T(p_x+1,p_y,p_t))\|_2 = 0$$

Here, $w_{grad}$ (f, 1, 0) represents a forward-flow-traced gradient weighting function (which is described in greater detail below), $w_{channel}$ (f, 1, 0) represents a forward-flow-traced per-channel weighting function, $V(f_x, f_y, f_t)$ represents a forward-flow-traced input video frame at the time $f_t$, having a location $(f_x, f_y)$, and $T(p_x, p_y, p_t)$ represents the target image that includes a target pixel p at a time $p_t$, having a location $(p_x, p_y)$. Further, in this example, the forward-flow-traced east gradient constraint is determined by incrementing a value of the x coordinate by 1 (e.g., corresponding to the terms "$f_x+1$" and "$p_x+1$").

Further, the video editor 102 computes a backward-flow-traced gradient weighting function to obtain the backward-directional east gradient constraint, for example, using the substantially similar expression below.

$$w_{grad}(b,1,0) \cdot w_{channel}(b,1,0) \cdot \|(V(b_x,b_y,b_t)-V(b_x+1,b_y,b_t))-T(p_x,p_y,p_t)-T(p_x+1,p_y,p_t))\|_2 = 0$$

Here, $w_{grad}$ (b, 1, 0) represents a backward-flow-traced gradient weighting function (which is described in greater detail below), $w_{channel}$ (b, 1, 0) represents a backward-flow-traced per-channel weighting function, $V(b_x, b_y, b_t)$ represents a backward-flow-traced input video frame at the time $b_t$, having a location $(b_x, b_y)$, and $T(p_x, p_y, p_t)$ represents the target image described above.

In addition to the forward-flow-traced and backward-flow-traced gradient weighting functions for the east gradient constraints, the video editor 102 computes gradient constraints to the west of the target pixel. For example, the video editor 102 computes forward-flow-traced and backward-flow-traced gradient weighting functions for west gradient constraints in a similar manner. In this example, the video editor 102 uses the forward reference of the target pixel p to obtain a forward-flow-traced west gradient constraint, using the following expression.

$$w_{grad}(f,1,0) \cdot w_{channel}(f,1,0) \cdot \|(V(f_x,f_y,f_t)-V(f_x-1,f_y,f_t))-T(p_x,p_y,p_t)-T(p_x-1,p_y,p_t))\|_2 = 0$$

Similarly, the video editor 102 uses the backward-flow-traced position of the target pixel p to obtain the backward-flow-traced west gradient constraint, using the following expression.

$$w_{grad}(b,1,0) \cdot w_{channel}(b,1,0) \cdot \|(V(b_x,b_y,b_t)-V(b_x-1,b_y,b_t))-T(p_x,p_y,p_t)-T(p_x-1,p_y,p_t))\|_2 = 0$$

In this example, the forward-flow-traced west gradient constraint is obtained by decrementing a value of the x coordinate by 1 (e.g., corresponding to the terms "$f_x-1$" and "$p_x-1$"). Similarly, the backward-flow-traced west gradient constraint is determined by decrementing a value of the x coordinate by 1 (e.g., corresponding to the terms "$b_x-1$" and "$p_x-1$").

As a result, the video editor 102 computes four gradient constraints (e.g., for each cardinal direction N, E, S, W), and each cardinal direction includes the two temporal directions (e.g., forward-flow-traced and backward-flow-traced temporal directions). Thus, the video editor 102 obtains a total of eight gradient constraints. It should be appreciated that in some examples, the total number of constraints used by the video editor 102 may be different. For example, as described above, the total number of constraints may be greater for a larger sample size of neighboring pixels. In additional or alternative aspects, the total number of constraints may be reduced based on a selective omission of one or more constraints, for example, that correspond to an absence of a forward-flow-traced position f or backward-flow-traced position b for a given target pixel p. Additionally, one or more constraints may be selectively omitted if, for example, the neighboring pixel is not present in the target image T because it is out of the frame or because it did not exist in the source image (e.g., input video frame V).

As described above, the video editor 102 computes the forward-flow-traced and backward-flow-traced gradient constraints in each of the four cardinal directions using a weighting function $w_{grad}$. In this example, the weighting function $w_{grad}$ is used to provide a weight to gradient constraints based on their respective textures. For instance, the weighting function $w_{grad}$ is designed to provide a higher weighted value to gradient constraints that correspond to a hole region with less texture. Further, the weighting function $w_{grad}$ is also designed to provide a lower weighted value to gradient constraints that correspond to a hole region with more texture.

In this example, the video editor 102 computes the weight of each gradient constraint as a function of the magnitude of the respective gradient constraint. For example, the video editor 102 determines a weighting function $w_{grad}$ with the following expression.

$$w_{grad}(r, x, y) = \exp\left(-\frac{\|(V(r_x, r_y, r_t) - V(r_x + x, r_y + y, r_t))\|_2}{\sigma^2}\right)$$

Here, $w_{grad}$ (r, x, y) represents the gradient weighting function, $V(r_x, r_y, r_t)$ represents a reference input video frame at time $r_t$, having a location $(r_x, r_y)$, and $\sigma$ controls a shape of the gradient weighting function. Further, the video editor

102 adjusts the weight of the gradient constraint, for example, by applying the gradient weighting function $w_{grad}$ (r,x,y) to the respective gradient constraint.

For instance, the video editor 102 may use a particular value for a to control the desired shape of the gradient weighting function. In one example, the video editor 102 may use a value of σ=0.1 to ensure that only portions of the hole region with a very low texture will receive a higher weight, while the remaining portions of the hole region does not receive the higher weight. In some examples, the video editor 102 may use a value of σ=0.4 to apply a higher weight to portions of the hole region up to, and including, moderate textures. In additional or alternative aspects, the video editor 102 may use default value for U. For instance, the video editor 102 may apply a default value of σ=0.2 as a compromise between the two examples described above.

At block 210, the process 200 involves updating the color data of the target pixel subject to the gradient constraints. For instance, the video editor 102 updates the color data of the target pixel p subject to the gradient constraints. In this example, the video editor 102 adds motion constraints to the eight gradient constraints from block 208. In this example, the motion constraints are based on traced color values associated with the target image. For instance, the video editor 102 computes the motion constraints using the expression below.

$$w_{screen}(f) \cdot \|(T(p_x,p_y,p_t) - \text{mix}(V(b_x,b_y,b_t), V(f_x,f_y,f_t)))\|_2 = 0$$

Here, $w_{screen}(f)$ represents a screened weighting function, $T(p_x, p_y, p_t)$ represents the target image described above, and mix $(V(b_x, b_y, b_t), V(f_x, f_y, f_t))$ represents the mixing function that is also described above. Thus, in this example, the video editor 102 uses a total of nine constraints per target pixel in the hole region.

The screened weighting function $w_{screen}$ is used to provide a weight to motion constraint based on a presence or an absence of a forward-flow-traced position f or backward-flow-traced position b for a given reference input video frame. In this example, the video editor 102 computes the weighting function $w_{screen}$ using the following expression.

$$w_{screen}(r) = \text{exist}(f, b) - \sum_{x,y} w_{grad}(r, x, y)$$

Here, $w_{screen}(r)$ represents the screened weighting function, a value of exist(f, b) corresponds to an existence of either a forward-flow-traced position f, backward-flow-traced position b, or both, and $w_{grad}$ (r, x, y) represents the gradient weighting function described above. Since the value of exist(f, b) corresponds to the existence of either a forward-flow-traced position f, backward-flow-traced position b, or both, the value of exist(f, b) is either 2 (when both f and b exist) or 1 (when only f or b exists). The video editor 102 adjusts the value of the motion constraint, for example, by applying the screened weighting function $w_{screen}(r)$ to the motion constraint.

In some examples, the video editor 102 updates the color data of the target pixel p subject to the gradient constraints by adjusting color channels[c] (e.g., red, green, or blue). For instance, in one example, the video editor 102 down-weights color channels to correct for either over-saturation or under-saturation. In this example, the video editor 102 computes a per-color-channel weighting function $w_{channel}$ using the following expression.

$$w_{channel}(r, x, y)[c] = \begin{cases} 1 & 0.1 < V(r_x + x, r_y + y, r_t)[c] < .9 \text{ and } 0.1 < V(r_x, r_y, r_t)[c] < .9 \\ 0.0001 & \text{otherwise} \end{cases}$$

Here, $w_{channel}$ (r,x,y)[c] represents the per-color-channel weighting function, and $V(r_x, r_y, r_t)$[c] represents a reference input video frame at time $r_t$, location $(r_x, r_y)$ for a color channel [c]. Further, the video editor 102 selectively adjusts the gradient constraints by applying the per-color-channel weighting function.

Thus, the video editor 102 down-weights indexed colors for each of the color channels [c]. In other words, the weight of a gradient constraint is determined on a per-color-channel basis. For instance, if either of the target pixel or its neighbor has a saturated color value in that particular color channel, then the gradient constraint weight is omitted for that color channel. In some examples, the per-color-channel weight is not applied to screened constraints. In this case, a weight of a screened constraint is a function of its corresponding gradient magnitudes. Advantageously, down-weighting color channels increases an overall reliability of the gradient values for the color channels.

Updating color data includes any process in which video content, after being edited using the process 200, displays one or more modifications to the target region after playback. In some aspects, updating color data involves modifying an image layer that includes the target object in the video frames. In additional or alternative aspects, updating color data involves overlaying one or more image layers with the modified target region and one or more image layers that include the unmodified target object in the video frames. In one example, the video editor 102 creates a set of video frames having a mask in the shape of the target region, where pixels outside the target region are set to be transparent and pixels within the target region are set to be opaque. The video editor 102 updates the opaque pixels of this image layer at block 210. The video editor 102 creates a multi-layered set of video frames in which the layer having opaque pixels depicting the modified target region and transparent pixels elsewhere is overlaid on a source layer that includes the video content with the unmodified target region. Any number of layers, with different configurations of masks, are used to generate an output video having the modified target region.

Figure 3:
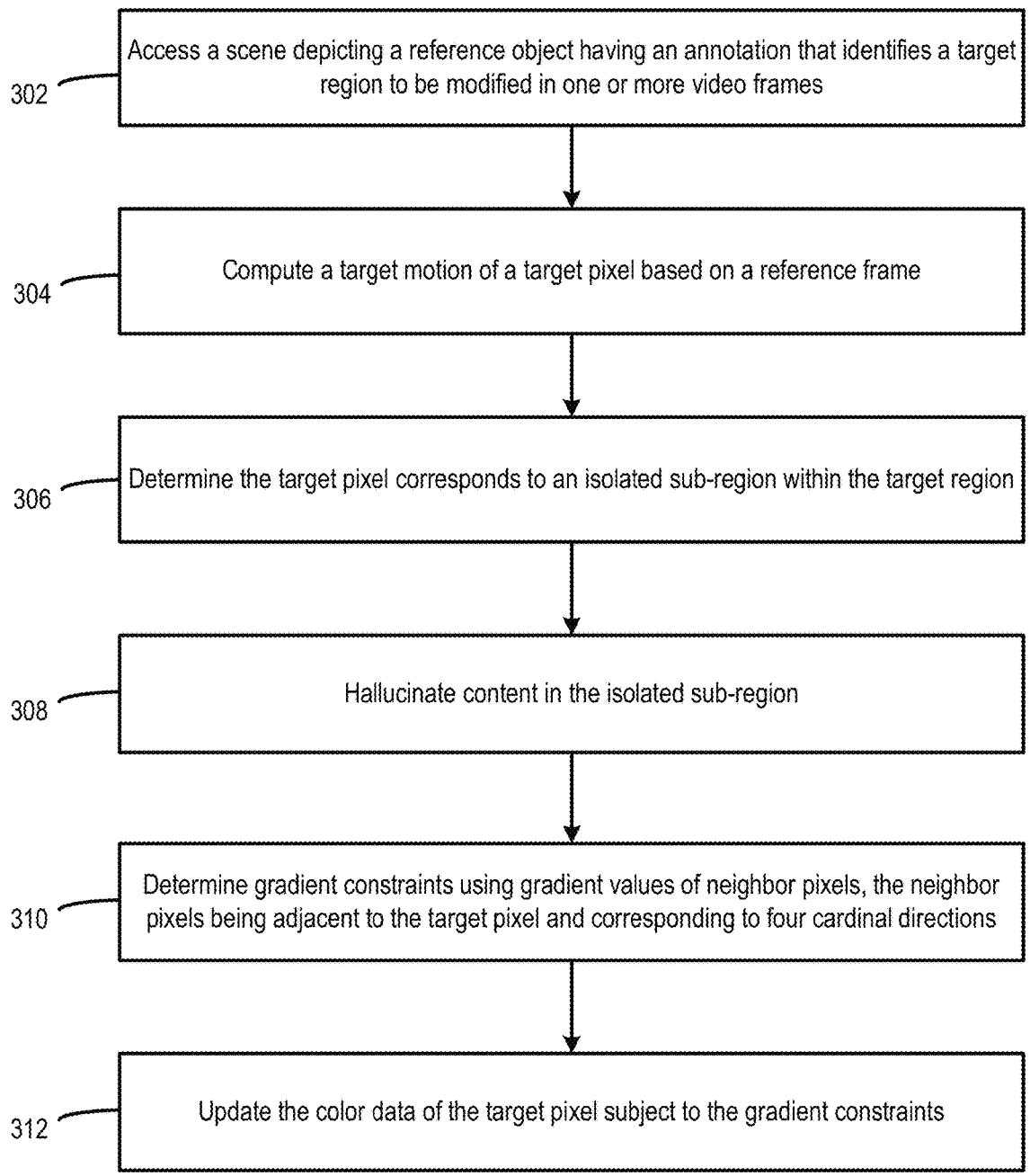
FIG. 3 depicts another example of a process for video inpainting using gradient constraints, according to certain aspects of this disclosure.

FIG. 3 depicts an example of a process 300 for performing for video inpainting using motion constraints, according to certain aspects of this disclosure. One or more operations described with respect to FIG. 3 are used to implement a step for modifying color data of a target pixel within a target region of a scene (e.g., scene 116) based on a target motion of the target pixel within the target region subject to a motion constraint defined by a set of sparse feature points. In some aspects, one or more computing devices implement operations depicted in FIG. 3 by executing suitable program code (e.g., the video editor 102, one or more of the engines depicted in FIG. 1, etc.). For illustrative purposes, the process 300 is described with reference to certain examples depicted in the figures. Other implementations, however, are possible.

At block 302, the process 300 involves accessing a scene that includes video frames depicting a reference object having an annotation that identifies a target region to be modified. For instance, the video editor 102 accesses video content from a data storage unit that is located on one or more memory devices available over a data network, one or more memory devices connected to a data bus on a computing device that executes the video editor 102, or some combination thereof. In some examples, block 302 accesses the scene 116 in a substantially similar manner as described above, for example, with respect to block 202 in FIG. 2.

At block 304, the process 300 involves computing a target motion of a target pixel based on a reference frame. In some examples, the video editor 102 computes the target motion of the target pixel based on a reference frame, for example, using a model of the reference object. For instance, the motion estimation engine 136 generates a modified motion field for a specific video frame (e.g., interpolates and/or estimates the motion of a pixel in the target region of a specific video frame) as a spatiotemporal function of the motion of the boundary pixels at the boundary of the target region. In some examples, block 304 computes the target motion of the target pixel in a substantially similar manner as described above, for example, with respect to block 204 in FIG. 2. In other aspects, the video editor 102 computes the target motion of the target pixel based on a reference frame using a boundary of the target region.

For instance, the video editor 102 computes the target motion using a boundary of the target region that is defined by boundary pixels. In this example, a boundary motion is a motion with respect to one or more pixels that define a boundary of a target region. The boundary can be, for example, the set of pixels that neighbor the union of the hole in a video frame n and a video frame n+1. This set of boundary pixels can include pixels having some commonality with one another that are adjacent to at least one other pixel not sharing the commonality (e.g., two pixels that share at least some color information and that have no common color information with respect to an adjacent pixel in the target region).

In some examples, determining the target motion involves computing the confidence of motion at the boundary of the hole. The confidence values are computed using any of the techniques described herein. In one example, the confidence engine 104 assigns a first confidence value to a first boundary pixel and assigns a second, higher confidence value to a second boundary pixel. Since the second confidence value is greater than the first confidence value, the motion of the second boundary pixel having the second confidence value will have a larger impact on the estimation of motion within the target region as compared to the motion of the first boundary pixel having the first confidence value. In some examples, the interpolation engine 106 uses the confidence values to interpolate the target motion of the target pixel in the target region from the boundary motion.

At block 306, the process 300 involves determining the target pixel corresponds to an isolated sub-region within the target region. For instance, the video editor 102 determines the target pixel corresponds to the isolated sub-region. The isolated sub-region is a portion of the target region that does not include a forward-flow-traced position f or a backward-flow-traced position b. In this example, the video editor 102 does not have a set of sparse feature points corresponding to a target motion of the target pixels within the target region, and thus, the video editor 102 cannot compute a target motion of the target pixel subject to a motion constraint. In order to avoid a degeneration of the system, the video editor 102 determines a need to hallucinate content within the isolated sub-region.

At block 308, the process 300 involves hallucinating content in the isolated sub-region. For instance, the video editor 102 hallucinates content in the isolated sub-region. Examples of hallucinating content in an isolated sub-region by video inpainting using a reference frame are described, for example, in U.S. patent application Ser. No. 16/378,906, U.S. patent application Ser. No. 16/585,433, which is now U.S. Pat. No. 10,872,637, and U.S. patent application Ser. No. 16/817,100, each of which are hereby incorporated, in their entirety, by reference herein. Thus, video editor 102 hallucinates content in the unseen isolated sub-region.

At block 310, the process 300 involves determining gradient constraints using gradient values of neighbor pixels. In some examples, block 310 determines the gradient constraints using gradient values of neighbor pixels in a substantially similar manner as described above, for example, with respect to block 204 in FIG. 2. But in this example, the neighbor pixels are adjacent to the target pixels and correspond to four cardinal directions. And in this example, the video editor 102 determines the gradient constraints using gradient values of neighbor pixels from the hallucinated content obtained from block 308.

In this example, the video editor 102 determines the gradient constraints using the hallucinated content from block 308. In some examples, the video editor 102 determines a weighting function $w_{grad}$ that is applied to the gradient constraints. Further, in some examples, the video editor 102 applies a hard-coded weight to the hallucinated content. In one example, the video editor 102 applies a hard-coded weight of 1.0 to the hallucinated content. Advantageously, using such a high hard-coded weight allows the video editor 102 to obtain more reliable gradient constraints, for example, by prioritizing the gradient information from the hallucinated content.

At block 312, the process 300 involves updating the color data of the target pixel subject to the gradient constraints. In some examples, updating the color data of the target pixel subject to the gradient constraints in block 312 is performed in a substantially similar manner as described above, for example, with respect to block 210 of FIG. 2.

In this example, the video editor 102 determines the screened constraints using the hallucinated content from block 308. In some examples, the video editor 102 determines a weighting function $w_{screen}$ that is applied to the screened constraints. Further, in some examples, the video editor 102 applies a hard-coded weight to the hallucinated content. In one example, the video editor 102 applies a hard-coded weight that is very low (e.g., 0.001) to the screened constraints of the hallucinated content. Advantageously, using hard-coded weighting reduces a likelihood of brightness tearing of the hallucinated content in the isolated sub-region, for example, by prioritizing gradient information (e.g., using a hard-coded weight of 1.0 from block 310) while de-emphasizing the color values (e.g., using a hard-coded weight of 0.001).

Updating color data includes any process in which video content, after being edited using the process 300, displays one or more modifications to the target region after playback. In some aspects, updating color data involves modifying an image layer that includes the target object in the video frames. In additional or alternative aspects, updating color data involves overlaying one or more image layers with the modified target region and one or more image layers that include the unmodified target object.

Examples of Video Inpainting a Target Region with a Reference Frame

Figure 4:
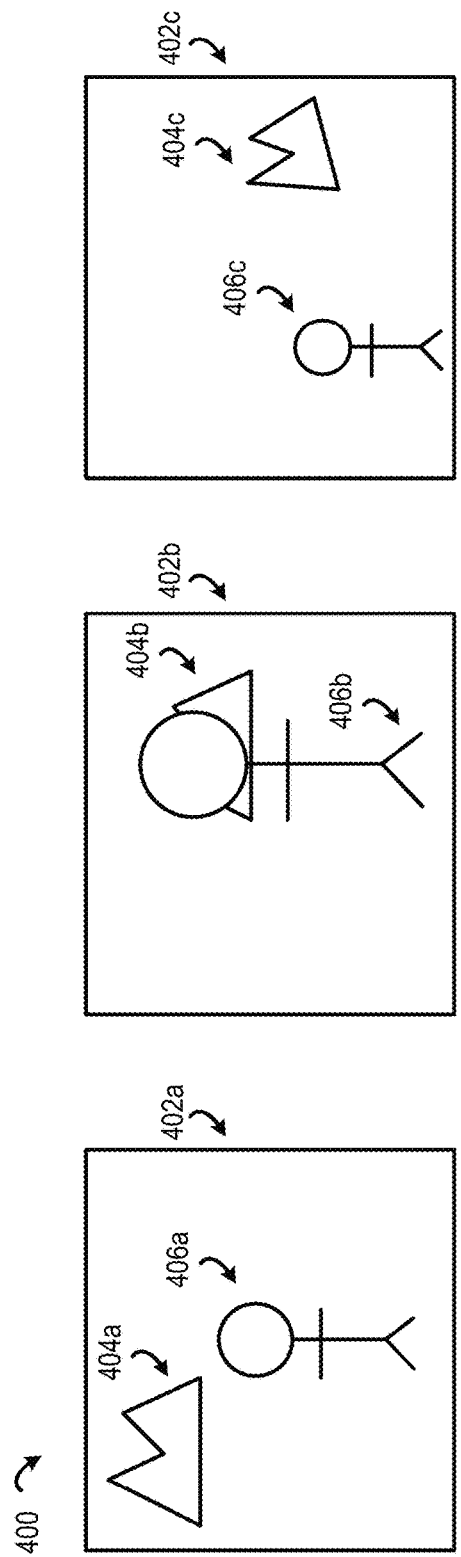
FIG. 4 depicts an example of a video that is modified with the video editing environment of FIG. 1, according to certain aspects of this disclosure.

FIG. 4 depicts an example of a video 400 that is modified using the video editing environment 100, according to certain aspects of this disclosure. In this example, the video editor 102 identifies, based on one or more inputs from the input device 128, an object (e.g., a stick person 406a-406c) to be removed from a scene (e.g., scene 116). For instance, the video editor 102 or other suitable software receives a user input (e.g., a drawing input) that selects one or more portions of the stick person 406a depicted in a first video frame 402a from a set of video frames. The video editor 102 or other suitable software annotates the first video frame 402a to specify that the stick figure identified via the user input should be removed.

In some aspects, the video editor 102 propagates the identification of an object in one video frame of a scene 116 to other video frames of the scene. For instance, the video editor 102 propagates the identification of the stick person 406a appearing in the first video frame 402a of the set of video frames to identify the same stick person 406b and 406c in a second video frame 402b and again in a third video frame 402c, respectively. In some aspects, the video editor 102 propagates such an identification with an annotation (e.g., annotation 120) associated with instructions for removal of an object. In some examples, the annotation 120 is a mask or other data that segments a target object from other objects in a video frame.

In some aspects, the color update engine 108 performs a pixel replacement operation or other color-modification operation with respect to a hole region associated with the stick person 406a-406c. For instance, the color update engine 108 identifies one or more replacement objects that are depicted within the scene 116, appearing in one or more video frames temporally located prior to the first video frame 402a of the set of video frames, subsequent to the first video frame 402a, or both. In some aspects, a replacement object is obtained from a reference frame (e.g., the reference frame 118 of FIG. 1).

In the example of FIG. 4, the color update engine 108 identifies pixels included in a mountain range object 404a-404c that is depicted in the scene 116. Video frames 402a and 404c are temporally located before and after the video frame 402b, respectively, each of which depicts respective mountain range objects 404a and 404c. The mountain range objects 404a and 404c are depicted without a corresponding stick person (e.g., stick person 406a and 406c) standing in front of the mountain range objects 404a and 404c. But the stick person 406b is spatiotemporally located directly in front of the mountain range object 404b, and a portion of the stick person 406b is partially occluding a viewing angle of the mountain range 406b.

The motion estimation engine 136 computes (e.g., interpolates) one or more motion vectors of objects (e.g., the mountain range object 404a-404c and/or the stick person 406a-406c) in the scene 116, which includes the video frame 202. The motion estimation engine 136 also assigns a motion value associated with the one or more motion vectors of the one or more objects. The motion value indicates a relative or scaled velocity or acceleration of an object, a boundary of the object, or a sparse feature point of the object. The color update engine 108 uses the interpolated motion to modify the pixel color information in a hole region corresponding to the stick person 406b in video frame 402b.

For instance, the color update engine 108 modifies pixels within a hole region corresponding to the stick person 406b in a video frame 402b to have the color information from the identified pixels included in the mountain range object 404a-404c. By doing so, the color update engine 108 generates a modified video frame, for example, the third video frame 402c. The third video frame 402c is modified to optionally replace or remove the stick person 406b of the second video frame 406b with one or more background objects. Furthermore, in a modified third video frame 402c, a hole region is modified to depict other objects in the scene 116 that were previously occluded by the stick figure and therefore not depicted in a video frame (e.g., the mountain range 404b of the second video frame 402b).

However, in the example of FIG. 4, the video editor 102 generates a modified video frame 402c using interpolation of a movement of a camera angle and/or of the stick person 406b without any motion constraints. As a result, the mountain range 404c appears askew the modified video frame 402c. As mentioned above, using interpolative data, for example, one or more boundary points associated with a target object (e.g., the stick person 406b), without any sparse feature points (e.g., 3D feature points within a reference object such as a 3D feature of the mountain range 404a-404b) often results in geometric distortion. As mentioned above, geometric distortions includes parallax effects, pulling effects, perspective distortions, warping, axial rotations, radial distortions, asymmetries, etc. In this example, the mountain range 204 is axially rotated, compressed, and has a distanced perspective.

Figure 5:
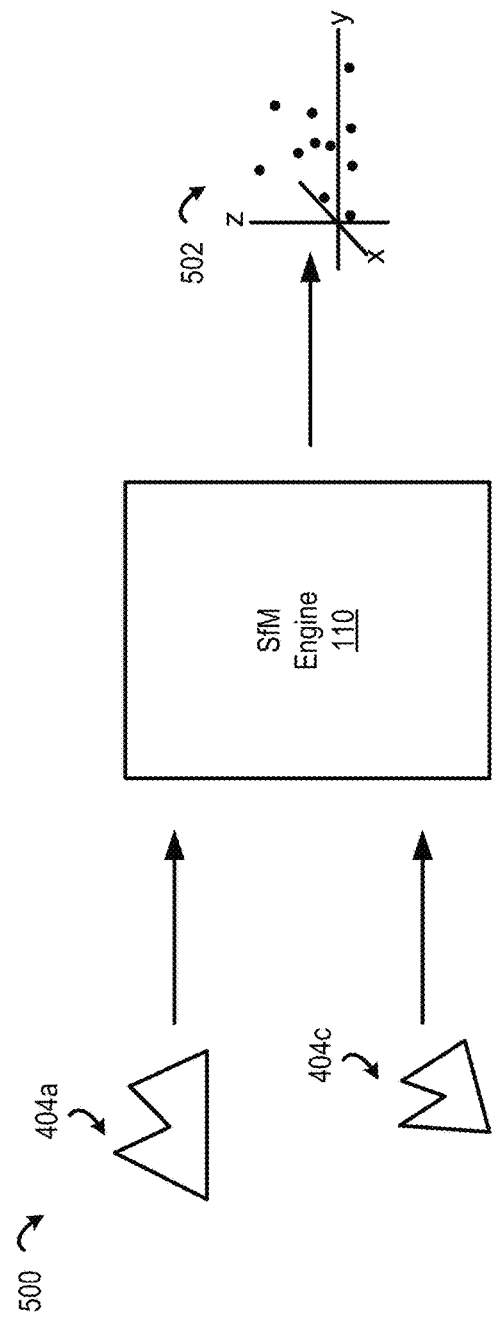
FIG. 5 depicts an example of generating feature points from a background reference object in the video of FIG. 4, according to certain aspects of this disclosure.

FIG. 5 depicts an example 500 of generating feature points from a background reference object in the video in the video of FIG. 4, according to certain aspects of this disclosure. More specifically, the example 500 depicts an SfM process that is used to obtain feature points of the mountain range 404a-404c depicted in FIG. 1, according to certain aspects of this disclosure. In this example, the video editor 102 uses the SfM engine 110 to identify features points associated with the mountain range 404a and 404c to generate a set of feature points depicted in the plot 502. For instance, the SfM engine 110 or other suitable software receives the set of video frames 402a-402c in a native temporal sequential order and perform a 3D reconstruction in a forward temporal order (e.g., in a received temporally-sequential order). In additional or alternative aspects, the SfM engine 110 receives the set of video frames 402a-402c in sequential order and perform a 3D reconstruction in a backwards temporal order (e.g., in a reverse temporally-sequential order of the received video).

In this example, the SfM engine 110 annotates the first video frame 402a to specify that the first video frame 402a is a reference video frame and the mountain range 404a is a reference object. The SfM engine 110 also annotates the reference video frame 402a or the reference object, for example, the mountain range 404b, to indicate that the reference object is partially occluded in the second video frame 402b. Similarly, the SfM engine 110 annotates the third video frame 402c to indicate the reference object includes a different axis of rotation, an amount of compression, an increase in a perspective distance, or another feature point discussed herein. In some aspects, the SfM engine 110 detects changes in the reference object $b_y$ comparing features associated with mountain range 404a to those of the mountain range 404c. The SfN engine 110 identifies and store each of the 3D reconstructed features points of the mountain range 404a and 404c to generate a set of feature points depicted in plot 502.

In some examples, the target region is bounded by a set of boundary pixels. In one such example, the boundary includes the boundary pixels on opposite sides of the target region 502a in video frame 122a. In one example, the boundary pixel is a part of a tree depicted in the video frames 402a-402c of FIG. 4, the target region 502a encompasses the stick person 406a-406c depicted in the video frames of FIG. 4, and the boundary pixel is a part of a fence depicted in the video frames 402a-402c of FIG. 4. Similarly, in the video frame 122b, the boundary includes the boundary pixels and (e.g., pixels from the abovementioned tree and fence, having different spatiotemporal locations and motion vectors from a camera movement). The boundary pixels and are on opposite sides of the target region 502b (e.g., the target object, the stick person 406a-406c of FIG. 4, having a different spatiotemporal location), in the video frame 122b, the boundary points include the boundary pixels and (e.g., pixels from a tree and a fence in FIG. 4 at different locations) on opposite sides of the target region 502c (e.g., the target object of the stick person 406a-406c of FIG. 4 at a different location).

In one example, the video editor 102 updates the color data in a target region 502c as a function of one or more sparse feature points (e.g., reference pixel) corresponding to 3D feature points of a reference object (e.g., reference object 404a). In some aspects, the reference object 404a is obtained from a user-specified reference video frame (e.g., reference frame 118). The video editor 102 generates a constraints for a video frame (e.g., video frame 122c) by applying the color data obtained from the sparse feature points of reference object 404a within a constrained target region (e.g., target region 502c). In this example, reference object 404b is occluded by a motion associated with target region 502b in the video frame 122b.

In this example, the video editor 102 uses the sparse feature points of the reference object 404a (e.g., assigned pixel values, pixel locations, axes of rotation, relative size, etc.) to generate a set of motion constraints associated with the reference object 404b. The video editor 102 generates the reference object 404b based on an interpolated motion of the target region 502b. In some aspects, the video editor 102 uses the motion estimation engine 136 to determine a motion vector of the target regions 502a and 502c. The video editor 102 uses the motion vector to interpolate a relative location of occluded reference object 404b. Thus, when infilling the target region 502b, the video editor 102 reproduces an accurate representation (e.g., conforming with a ground true perspective) of the reference object 404b based on the motion constraints obtained from the sparse feature points, while also having an interpolated relative location of the reference object 404b within the target region.

In some examples, the video editor 102 interpolates a motion within a target region based on boundary pixels. For example, the video editor 102 computes a motion field 712 based on an analysis of the video frame 122a and the video frame 122b. Because the target region 502a identifies a location of a target object to be removed from the video frames 122a and 122b, a motion field 712 is an "unknown" motion for a target pixel within the target region 502, where the target region 502 indicates motion for a target object to be removed from the video frame 122a. The "unknown" motion is an unknown desired motion, for example, having a motion vector that is a ground true motion vector, which represents a motion that would have been computed in the target region if the video frames 122a and 122b had been captured without the target object to be removed.

The motion estimation engine 136 computes, based on the boundary motion, an estimated motion with respect the target region 502. Each boundary pixel is associated with a respective boundary motion represented by a vector. The motion estimation engine 136 uses the collection of vectors to compute an estimated motion for a target pixel within the target region 502. The motion estimation engine 136 generates a modified motion field that includes a motion vector for the estimated motion in the target region 502. The video editor 102 uses the estimated motion to trace, through time, paths of pixels (or, more specifically, objects that include the pixels) between locations outside the target region to locations inside the target region. Doing so allows the video editor 102 to identify or determine the appearance of these pixels using video frames in which the pixels are not in the target region.

For instance, in one example, the video editor 102 modifies color information of a target pixel within a modified target region based on an estimated motion computed by the motion estimation engine 136. In this example, the video editor 102 has been used to replace the video frame 122a with a reference frame 118. The reference frame 118 has some of the same content as the video frame 122a, such as boundary pixels. But the reference frame 118 also includes one or more reference objects comprising reference pixels, where the reference objects have been created in the reference frame 118 via one or more user inputs.

In this example, the color update engine 108 accesses the reference frame 118, the video frame 122b, and a modified motion field. The color update engine 108 "traces" the path of a reference pixel from a location in the reference frame 118 to a location within the target region 502b, for example, as depicted in the video frame 122b. Using the example of FIG. 4, a "traced" pixel is a portion of a reference object, for example, mountain range 404a-404c, that is occluded by the target object, for example, the stick person 406a-406c, in the video frames 122a and 122b, but that a user has added to one or more reference frames 118.

A reference video frame (e.g., reference frame 118), in some examples, is sequenced before one or more of the video frames 122a and 122b, sequenced after one or more of the video frames 122a and 122b, or both. In a simplified example, a pixel located at position (3, 1) in a reference frame 118 has a brown color, for example, be a part of the "brown fence" object. The motion vector indicates the motion through the target region that would have been associated with the "brown fence" pixel if the "brown fence" object had not been occluded by target "stick person" object in the video frames 122a and 122b. For instance, the motion vector for this "fence" pixel indicates a motion of one pixel up and three pixels right. The color update engine 108 therefore determines that, in the absence of the occlusion by the "stick person" object, the "fence" pixel would have been located in the target region of the video frame 122b at position (4, 4) (e.g., one pixel up and three pixels right from the (3,1) location).

The color update engine 108 therefore copies color information from the pixel located at position (3,1) in the reference frame 118 (e.g., the "fence" pixel) to generate a target pixel located at position (1,4) in the modified frame 126b. In some aspects, the target pixel includes identical color information as compared to the reference pixel. In additional or alternative aspects, the video editor 102 modifies the color information obtained from the reference pixel when generating the target pixel. For instance, if the appearance of a reference object (e.g., the mountain range 404a-404c object) would change from the reference frame 118 to the video frame 122b (e.g., due to changes in view angle), the color update engine 108 modifies color information of pixels used to depict that reference object in the modified frame 126b. In one example, the scene 116, as depicted in the reference frame 118, includes brighter colors to depict a more vibrant image.

In some examples, the video editor 102 uses the estimated motion and the color information of pixels to infill a constrained video. Doing so allows the video editor 102 to correct errors associated with a larger infilled target region to ensure a natural appearance of these pixels using video frames in which the pixels are not in the target region.

For instance, in one example, the video editor 102 generates a constrained, modified video frame using the interpolated motion and the propagated color information, according to certain aspects of this disclosure. In this example, the video editor 102 obtains sparse feature points from reference pixels of the reference frame 118. The video editor 102 verifies the resulting modified video frame produced by a combination of the motion estimation engine 136 and the color update engine 108. For instance, the video editor 102 employs the validation engine 112 to verify the accuracy of one or more features of the infilled image depicted in the modified video frame. In some aspects, the validation engine 112 obtains user-selected sparse feature points to ensure the accuracy of an infilled region corresponding to the modified target region 502, the target pixel, or both. In one example, the validation engine 112 uses sparse feature points generated by the SfM engine 110 to perform the verification.

Other examples of the sparse feature points include be a randomly selected set of user-selected feature points, a randomly generated set of sparse feature points, or some combination thereof. The validation engine 112 validates updated color information (e.g., pixel values or other color data) of the modified target region 502 based on the set or subset of sparse feature points. For instance, the validation engine 112 re-computes color data of the modified target region 502 across the set of video frames in a forward temporal order or a backwards/reverse temporal order. In this example, the validation engine 112 re-computes color data of the modified target region 502 to generate a constrained target region in the modified video frame subject to the constraints of the sparse feature points.

In some aspects, the video editor 102 or other suitable program code (e.g., validation engine 112) re-assigns pixel values corresponding to one or more incongruent spatiotemporal relationships. For instance, the validation engine 112 determines that the modified target region 502 and/or target pixel do not accurately convey a ground true perspective (e.g., one or more geometric shapes). The validation engine 112 corrects the inaccurately generated video frame(s) by changing one or more pixel values of a target pixel within the modified target region 502. The validation engine 112 alters a single pixel value to correct for a first visual distortion associated with the target pixel to generate a target pixel subject to a motion constraint (e.g., a sparse feature point from the reference pixels). The validation engine 112 also alters pixel values to correct for a second visual distortion associated with the modified target region 502 to generate the constrained target region in the modified video frame. The video editor 102 or other suitable program code are configured to generate corrective measures to constrain inaccurate results using any of the techniques discussed herein.

Figure 6:
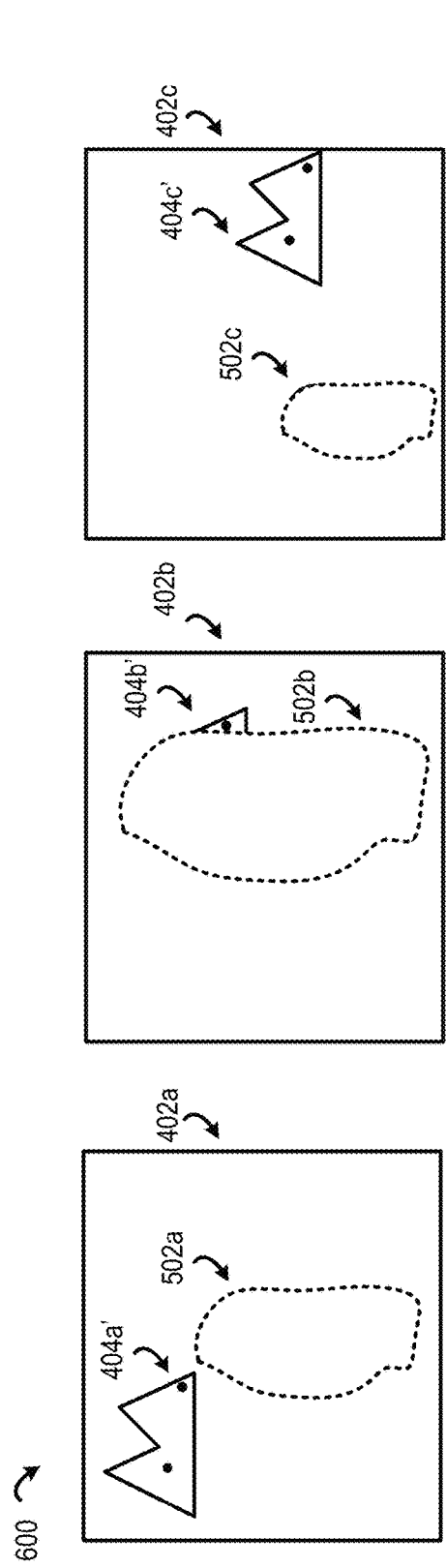
FIG. 6 depicts an example of the video from FIG. 4 with a target region that has been annotated, according to certain aspects of this disclosure.

FIG. 6 depicts an example 600 of the video from FIG. 4 with a target region that has been annotated, according to certain aspects of this disclosure. The example 600 depicts an example of a target region associated with the video 400 that is modified using the video editing environment 100, according to certain aspects of this disclosure. In this example, the video editor 102 identifies, based on one or more inputs from the input device 128, a target object (e.g., a stick person 406a-406c) is to be removed from the scene 116. In some aspects, the video editor 102 receives a user input, via the input device 128, that indicates the stick person 406a-406c is to be removed from the set of video frames 402a-402c. However, in some aspects, the video editor 102 receives one or more automated inputs that indicates another target object (e.g., an artifact, lint, dust, a visual distortion, a scratch mark on a lens, etc.) is to be removed from the set of video frames 402a-402c.

In some aspects, a user input includes tracing or outline a portion of a particular video frame (e.g., the first video frame 402a) corresponding to a target object (e.g., the stick person 406a). In additional or alternative aspects, the user input indicates a location corresponding to the target object to be removed. Having received a location associated with a target object, the video editor 102 or another suitable program code automatically selects or otherwise identifies a target region corresponding to the stick person 406a according to any of the techniques described herein. The video editor 102 traces the target object by circumscribing the stick person 406a-406c to generate a target region 502a-502c.

Continuing with this example, the target region 502a-502c encompasses a portion of each video frame, in the set of video frames 402a-402c, that further occludes one or more background images within the respective video frames. For instance, the target region 502b that corresponds to a previous location associated with the target object, stick person 406b, further occludes the mountain range 404b'. But in this example 400, the video editor 102 selects a subset of the feature points as data points (e.g., sparse feature points) associated with the mountain range 404a'-404c,' to ensure its structural integrity. The video editor 102 uses these sparse feature points to correct distortions in a geometric shape or color of the mountain range 404c'. Thus, the video editor 102 annotates the target region 502a-502c, correcting otherwise visually distorted background objects (e.g., mountain range 404c of FIG. 4) and avoiding the axial rotation, compression, and distanced perspective discussed above.

Figure 7:
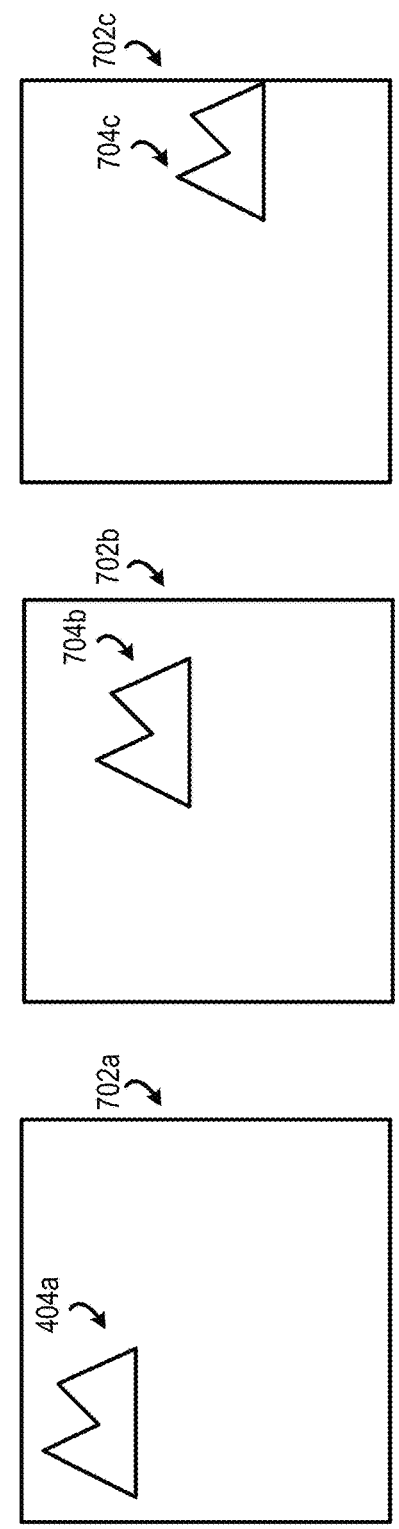
FIG. 7 depicts an example of the video from FIG. 4 with a target region that has been inpainted, according to certain aspects of this disclosure.

FIG. 7 depicts an example 700 of the video 400 from FIG. 4 with a target region that has been inpainted. This example 700 of the video 400 is modified using the video editing environment 100 according to certain aspects of this disclosure. In the example 700 of FIG. 7, the video editor 102 has interpolated an estimated target motion of a target object, the stick person 406a-406c across the set of video frames 402a-402c in FIG. 4. The video editor 102 has also obtained feature points associated with a reference object, the mountain ranges 404a-404c, from a 3D reconstruction performed by the SfM engine 110 in FIG. 5. The video editor 102 has now received the identification of the target region 702a-702c from the user input discussed in FIG. 4. In the example 700, the video editor 102 infills the target region 702a-702c according to one or more modifications to generate modified video frames 702a-702c.

For instance, the video editor 102 receives a user input of a particular reference video frame (e.g., video frame 402a of FIG. 4) with instructions to infill the target region 702a-702c of the set of video frames 402a-402c, with one or more background objects (e.g., one or more reference objects). In this example, the modifications also include the selection of the reference object, the mountain range 404a, to infill the corresponding portions within the target region 702a-702c of the video frames 402a-402c. The video editor 102 uses the interpolated target motion of the stick person 406a-406c provided by the motion estimation engine 136, the extrapolated (e.g., detected pixel values, pixel locations, or both for a depicted object) sparse feature points of the mountain range 404a'-404c' provided by the SfM engine 110, and the identified target region 702a-702c to infill pixel locations corresponding to target pixels within the target region 702a-

702c. For example, the video editor 102 employs the color update engine 108 to assign pixel values to pixel locations corresponding to the target region 702b and the occluded reference object, mountain range 404b' from FIG. 6.

In this example, the color update engine 108 assigns pixel values, using the sparse feature points and one or more boundary points of the target region 502b of FIG. 6, to generate the modified video frames 702a-702c. The color update engine 108 determines that the user-selected target region 502a of FIG. 6 does not occlude or otherwise distort the reference object, mountain range 404a. Thus, the color update engine 108 copies the mountain range 404a from the video frame 402a. However, the color update engine 108 determines the mountain range 404b is partially occluded by the target region 502b of FIG. 6, and thus, uses the visible sparse feature point within the mountain range 404b' to infill the corresponding portion of the target region 702b. In some aspects, the color update engine 108 compares a color map of the mountain range 404b' to another of the mountain range 404a' to obtain one or more spatiotemporal relationships between one or more target pixel locations within the target region 702b. In some aspects, the color update engine 108 obtains these color maps from the SfM engine 110. In this example, the color update engine 108 uses these spatiotemporal relationships to generate modified video frames 702a-702c having a copied mountain range 404a and a modified mountain range 704b-704c.

Examples of Using Corrective Lighting for Video Inpainting of a Target Region

Figure 8:
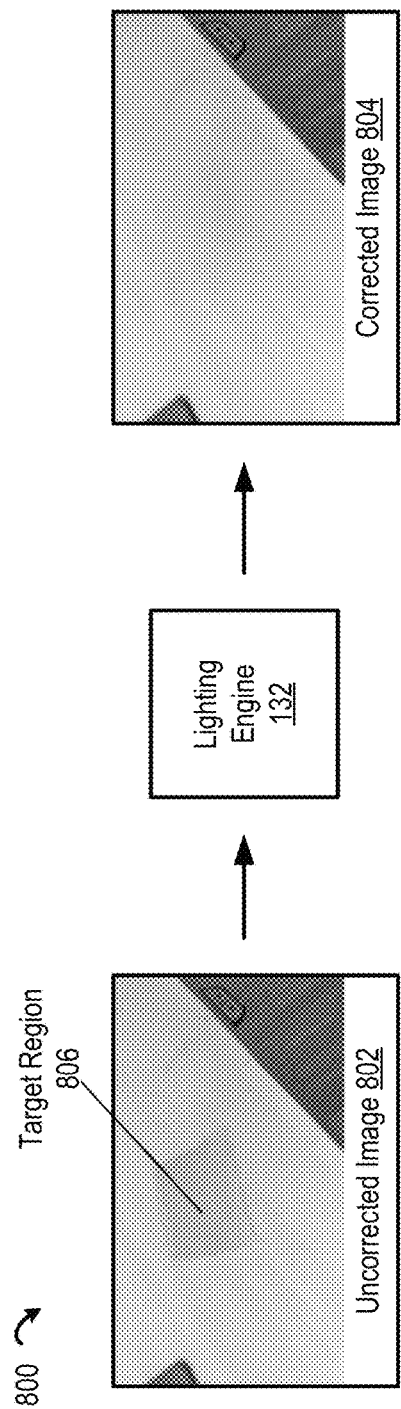
FIG. 8 depicts an example of a video that is modified with the video editing environment of FIG. 1, according to certain aspects of this disclosure.

FIG. 8 depicts a simplified example 800 of a video editor 102 being used to modify a target region to include content from a reference video frame. In this example, the video editor 102 estimates motion within a target region using the motion at one or more boundary points of the target region (e.g., a hole region within a particular video frame or set of video frames). To do so, the video editor 102 computes optical-flow motion for each video frame in a set of video frames. This computed motion is used, for example, to remove a certain object from a scene (e.g., scene 116) by keeping track of the movement of other objects depicted behind the object to be removed. Keeping track of the movement of these other objects facilitates updating a target region (e.g., target region 806) with color information from suitable pixels (e.g., pixels depicting the other objects in the scene 116).

In this example, the video editor 102 has modified the target region 806 to remove an undesired object. For example, a user has selected an undesirable object to be removed from a captured image, such as a sandwich in a sandwich baggie that was present in the captured image. In this example, an uncorrected image 802 depicts such a captured image. The uncorrected image 802 depicts an image of a wood-grained standing desk, with rightmost lift controls, and a leftmost corner of a laptop. Further, in this example, the video editor 102 has executed a trained machine learning model (e.g., machine learning model 134) to remove the undesired sandwich in the sandwich baggie, corresponding to the target region 806, from the surface of the standing desk. In some examples, the machine learning model 134 infills the target region 806 according to any of the techniques described herein. For example, the machine learning model 134 executes the motion estimation engine 136, the color update engine 108, and SfM engine 110 to generate the uncorrected image 802.

In this example, the video editor 102 then executes the lighting engine 132. The lighting engine 132 performs corrective lighting for the in-painted region (e.g., target region 806). The target region 806 is depicted having the correct color data to infill the user-selected hole region on the wood-grained table-top surface of the standing desk. But in this example, the uncorrected image 802 still includes a film-like opacity that corresponds to the target region 806. The lighting engine 132 uses color data from the color update engine 108 and a motion constraint from the motion estimation engine 136 to determine gradient constraints. The lighting engine 132 uses these gradient constraints to smooth the target region 806. As a result, the lighting engine 132 generates the corrected image 804, which depicts the wood-grained table-top surface of the standing desk as a smooth, contiguous surface.

For example, the lighting engine 132 uses gradient constraints from any number of different video frames. In some examples, the lighting engine 132 uses any number of gradient constraints from each of the different video frames. In one example, the lighting engine 132 uses gradient constraints that are derived from neighboring pixels (e.g., adjacent to the target pixel) that are obtained from different video frames. For instance, the lighting engine 132 uses gradient constraints from four neighbor pixels (e.g., four cardinal directions-N, S, E, W).

In this example, the lighting engine 132 computes gradient constraints for each of the four neighbor pixels. Further, the lighting engine 132 computes gradient constraints for each of the four neighbor pixels using both a forward-flow-traced position f and a backward-flow-traced position b, for example, using any of the techniques described herein. Thus, the lighting engine 132 generates a total of eight gradient constraints. In additional or alternative aspects, the lighting engine 132 applies a gradient weighting function $w_{grad}$ to the gradient constraints. The lighting engine 132 provides the gradient constraints to the video editor 102.

The video editor 102 uses the gradient constraints from the lighting engine 132 to update the color data of the target pixel. For instance, the video editor 102 updates the color data of the target pixel p subject to the gradient constraints by determining motion constraints based on traced color values associated with the target image. In some examples, the video editor 102 applies a screened weight to the motion constraints of a given neighbor pixel, for example, based on a proximity of that neighbor pixel to the target pixel. In one example, a screened weighting function $w_{screen}$ is used to provide a weight to the motion constraint based on a presence or an absence of a forward-flow-traced position f or backward-flow-traced position b for a given reference input video frame.

In some examples, the video editor 102 updates the color data of the target pixel subject to the gradient constraints by adjusting color channels. Further, in some examples, the video editor 102 applies a per-color-channel weight to each of the color channels. For instance, the video editor 102 down-weights indexed colors for each of the color channels to adjust a weight of a gradient constraint on a per-color-channel basis. But in some examples, the video editor 102 does not apply a per-color-channel weight to screened constraints. The video editor 102 updates the color data by validating the corrected image 804 using the validation engine 112. After being edited, the video editor 102 executes the mixer 114 to generate, for display, the corrected image 804 with the modifications to the target region 806 after playback.

Figure 9:
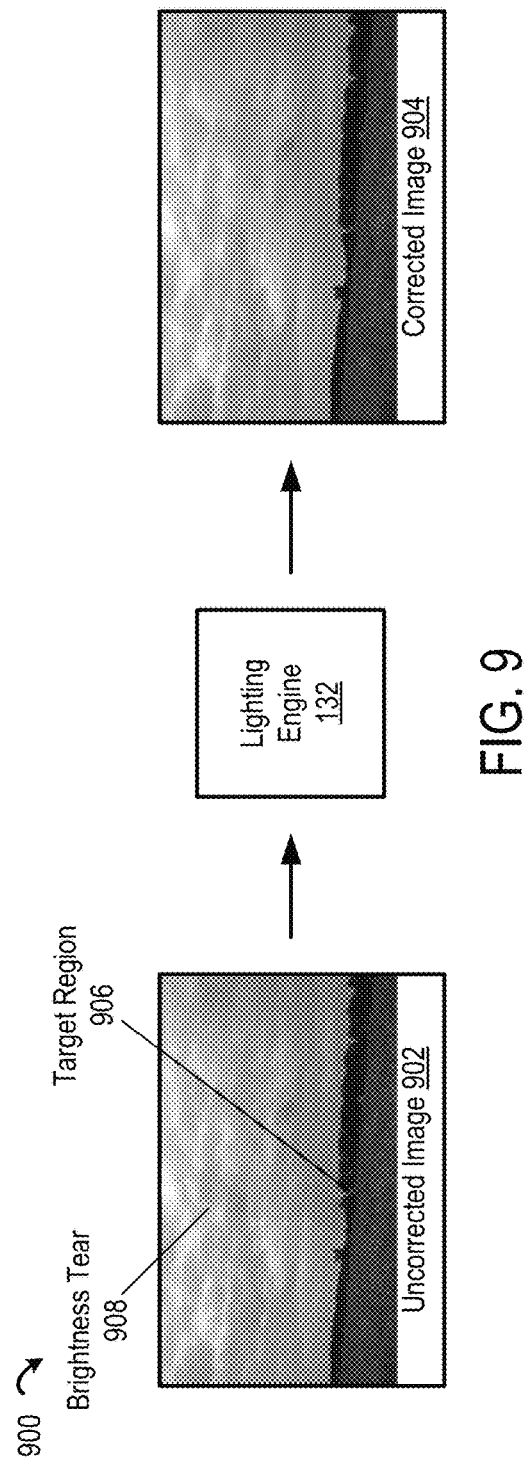
FIG. 9 depicts another example of a video that is modified with the video editing environment of FIG. 1, according to certain aspects of this disclosure.

In the example 900 depicted in FIG. 9, a video editor 102 is used to modify a target region to include content from a reference video frame. Like the example 800 of FIG. 8, the video editor 102 estimates motion within a target region using the motion at one or more boundary points of the target region by computing optical-flow motion for each video frame in a set of video frames.

In this example, the video editor 102 has modified a target region 906 to remove an undesired object. For example, a user has selected an undesirable person that is to be removed from a captured image (uncorrected image 902). The uncorrected image 902 depicts foreground imagery that includes a grassy field with an uneven pitch, which is set against a background that includes a treeline and a cloud-covered sky. Similar to the example 800 of FIG. 8, the video editor 102 executed the machine learning model 134 to remove the undesired person walking across the field, corresponding to the target region 906. The machine learning model 134 infills the target region 806 according to any of the techniques described herein.

The video editor 102 executes the lighting engine 132 to correct the lighting for the in-painted, target region 906. For example, the target region 906 is depicted having the correct color data to infill the user-selected hole region, replacing the person walking across the field with the appropriate color data for the grass, treeline, and cloudy skyline. In this example, the uncorrected image 902 includes a brightness tear 908 that was caused, in part, by infilling the target region 906.

The brightness tear 908 is an artifact created by the removal of the person walking from the leftmost area of the uncorrected image 902 to the rightmost area. The brightness tear 908 shown in the uncorrected image 902 reflects a change in an overall amount of brightness over time, for example, as the person that is to be removed walked across the field while the sun was setting behind the cumulus clouds in the skyline. And in this example, the curved, squiggly nature of the substantially bifurcating brightness tear 908 also reflects both the shape of person removed by the SfM engine 110 and a relatively low texture of the cumulus clouds in the skyline. In contrast, the brightness tear 908 of the uncorrected image 902 is nearly undetectable in the lowermost portion because of the high-frequency details that are associated with the sharp edges of the blades of grass.

The lighting engine 132 uses color data from the color update engine 108 and a motion constraint from the motion estimation engine 136 to determine gradient constraints. The lighting engine 132 uses these gradient constraints to smooth the target 906. As a result, the lighting engine 132 generates the corrected image 904.

Example of a Computing System for Implementing Certain Aspects

Figure 10:
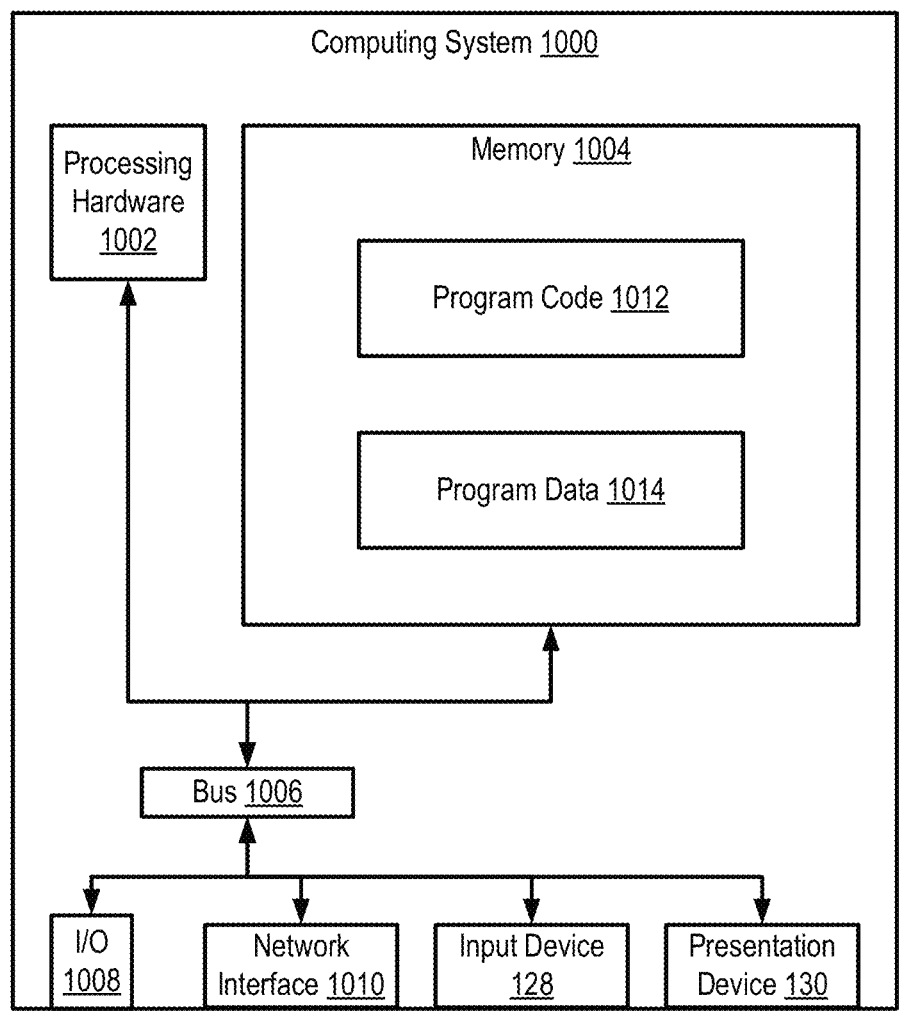
FIG. 10 depicts an example of a computing system for implementing certain aspects of this disclosure.

Any suitable computing system or group of computing systems are used for performing the operations described herein. For example, FIG. 10 depicts an example of a computing system 1000. In some aspects, the computing system 1000 includes processing hardware 1002 that executes program code 1012 (e.g., the video editor 102, the motion estimation engine 136, the color update engine 108, etc.), a memory device 1004 that stores one or more sets of program data 1014 computed or used by operations in the program code 1012 (e.g., a set of input video frames, annotations 120 identifying target regions, motion fields, a set of edited video frames, etc.), one or more input devices 128, and one or more presentation devices 130 for displaying graphical content generated by executing the program code 1012. For illustrative purposes, FIG. 10 depicts a single computing system on which the program code 1012 is executed, the program data 1014 is stored, and the input devices 128 and presentation device 130 are present. But various applications, datasets, and devices described are stored or included across different computing systems having devices similar to the devices depicted in FIG. 10.

The depicted example of a computing system 1000 includes processing hardware 1002 communicatively coupled to one or more memory devices 1004. The processing hardware 1002 executes computer-executable program code stored in a memory device 1004, accesses information stored in the memory device 1004, or both. Examples of the processing hardware 1002 include a microprocessor, an application-specific integrated circuit ("ASIC"), a field-programmable gate array ("FPGA"), or any other suitable processing device. The processing hardware 1002 includes any number of processing devices, including a single processing device.

The memory device 1004 includes any suitable non-transitory computer-readable medium for storing data, program code, or both. A computer-readable medium includes any electronic, optical, magnetic, or other storage device capable of providing a processor with computer-readable instructions or other program code 1012. Non-limiting examples of a computer-readable medium include a magnetic disk, a memory chip, a ROM, a RAM, an ASIC, optical storage, magnetic tape or other magnetic storage, or any other medium from which a processing device reads instructions. The program code 1012 includes processor-specific instructions generated by a compiler or an interpreter from code written in any suitable computer-programming language, including, for example, C, C++, C#, Visual Basic, Java, Python, Perl, JavaScript, and ActionScript.

The computing system 1000 also includes a number of external or internal devices, such as an input device 128, a presentation device 130, or other input or output devices. For example, the computing system 1000 is shown with one or more input/output ("I/O") interfaces 1008. An I/O interface 1008 receives input from input devices (e.g., input device 128) or provide output to output devices (e.g., presentation device 130). One or more buses 1006 are also included in the computing system 1000. The bus 1006 communicatively couples one or more components of a respective one of the computing system 1000.

The computing system 1000 executes program code 1012 that configures the processing hardware 1002 to perform one or more of the operations described herein. The program code 612 includes, for example, the video editor 102, the motion estimation engine 136, the color update engine 108, the SfM engine 110, the light engine 132, or other suitable program code that performs one or more operations described herein. The program code 1012 is resident in the memory device 1004 or any suitable computer-readable medium and is executed by the processing hardware 1002 or any other suitable processor. The program code 1012 uses or generates program data 1014. Examples of the program data 1014 include one or more of the memory frames, ground truth frames, feature-classification data, feature-selection data, key or value maps, etc. described herein with respect to FIGS. 1-9.

In some aspects, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, or the like. The computing system 1000 is able to communicate with one or more other computing devices via a data network using the network interface device 1010.

An input device 128 includes any device or group of devices suitable for receiving visual, auditory, or suitable input that controls or affects operations of processing hardware 1002. Non-limiting examples of the input device 128 include a recording device, touchscreen, mouse, keyboard, microphone, video camera, separate mobile computing device, etc. A presentation device 130 includes any device or group of devices suitable for providing visual, auditory, or suitable sensory output. Non-limiting examples of the presentation device 130 include a touchscreen, monitor, separate mobile computing device, etc.

Although FIG. 10 depicts the input device 128 and the presentation device 130 as being local to the computing device that executes the program code 1012, other implementations are possible. For instance, in some aspects, one or more of the input device 128 and the presentation device 130 includes a remote client-computing device that communicates with the computing system 1000 via the network interface device 1010 using one or more data networks described herein.

GENERAL CONSIDERATIONS

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein are performed in the operation of such computing devices. The system or systems discussed herein are not limited to any particular hardware architecture or configuration. A computing device includes any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages are used to implement the teachings contained herein in software to be used in programming or configuring a computing device. The order of blocks presented in the examples above can be varied—for example, blocks can be re-ordered, combined, and/or broken into sub-blocks. Certain blocks or processes are performed in parallel.

The invention claimed is:

1. A computer implemented method in which one or more processing devices perform operations comprising:
    identifying a target region to be modified in one or more video frames;
    determining that a target pixel is in a sub-region of the target region;
    based on determining that the target pixel is in the sub-region, hallucinating content into the sub-region;
    after hallucinating the content into the sub-region, identifying neighboring pixels that are adjacent to the target pixel in the sub-region in four cardinal directions, the neighboring pixels being part of the hallucinated content;
    determining gradient constraints using gradient values of the identified neighboring pixels in the hallucinated content; and
    updating color data of the target pixel subject to the determined gradient constraints.

2. The computer implemented method of claim 1, wherein determining the gradient constraints comprises computing a forward-flow-traced gradient constraint in the four cardinal directions.

3. The computer implemented method of claim 1, wherein determining the gradient constraints comprises computing a backward-flow-traced gradient constraint in the four cardinal directions.

4. The computer implemented method of claim 1, further comprising:
    determining that a target motion of the target pixel cannot be computed subject to a motion constraint; and
    based on determining that the target motion of the target pixel cannot be computing subject to the motion constraint, hallucinating the content into the sub-region.

5. The computer implemented method of claim 1, further comprising:
    identifying an area of the target region for which sparse feature points cannot be determined; and
    selecting the identified area as the sub-region.

6. The computer implemented method of claim 1, wherein the sub-region is a portion of the target region that does not include a forward-flow-traced position or a backward-flow traced position.

7. The computer implemented method of claim 1, wherein the content is hallucinated into the sub-region by video inpainting using a reference frame.

8. The computer implemented method of claim 1, further comprising applying a weighting function to the gradient constraints, wherein the weighting function prioritizes information from the hallucinated content.

9. A computing system comprising;
a processing device; and
a non-transitory computer-readable medium communicatively coupled to the processing device and storing program code, the processing device configured to execute the program code and thereby performing operations comprising:
identifying a target region to be modified in one or more video frames;
determining that a target pixel is in a sub-region of the target region;
based on determining that the target pixel is in the sub-region, hallucinating content into the sub-region;
after hallucinating the content into the sub-region, identifying neighboring pixels that are adjacent to the target pixel in the sub-region in four cardinal directions, the neighboring pixels being part of the hallucinated content;
determining gradient constraints using gradient values of the identified neighboring pixels in the hallucinated content; and
updating color data of the target pixel subject to the determined gradient constraints.

10. The computing system of claim 9, the operations further comprising:
determining that a target motion of the target pixel cannot be computed subject to a motion constraint; and
based on determining that the target motion of the target pixel cannot be computing subject to the motion constraint, hallucinating the content into the sub-region.

11. The computing system of claim 9, the operations further comprising:
identifying an area of the target region for which sparse feature points cannot be determined; and
selecting the identified area as the sub-region.

12. The computing system of claim 9, wherein the sub-region is a portion of the target region that does not include a forward-flow-traced position or a backward-flow traced position.

13. The computing system of claim 9, wherein the content is hallucinated into the sub-region by video inpainting using a reference frame.

14. The computing system of claim 9, the operations further comprising applying a weighting function to the gradient constraints, wherein the weighting function prioritizes information from the hallucinated content.

15. A non-transitory computer-readable medium having program code of a video editing tool stored thereon, wherein the program code, when executed by one or more processing devices, configures the one or more processing devices to perform operations comprising:
identifying a target region to be modified in one or more video frames;
determining that a target pixel is in a sub-region of the target region;
based on determining that the target pixel is in the sub-region, hallucinating content into the sub-region;
after hallucinating the content into the sub-region, identifying neighboring pixels that are adjacent to the target pixel in the sub-region in four cardinal directions, the neighboring pixels being part of the hallucinated content;
determining gradient constraints using gradient values of the identified neighboring pixels in the hallucinated content; and
updating color data of the target pixel subject to the determined gradient constraints.

16. The non-transitory computer-readable medium of claim 15, the operations further comprising:
determining that a target motion of the target pixel cannot be computed subject to a motion constraint; and
based on determining that the target motion of the target pixel cannot be computing subject to the motion constraint, hallucinating the content into the sub-region.

17. The non-transitory computer-readable medium of claim 15, the operations further comprising:
identifying an area of the target region for which sparse feature points cannot be determined; and
selecting the identified area as the sub-region.

18. The non-transitory computer-readable medium of claim 15, wherein the sub-region is a portion of the target region that does not include a forward-flow-traced position or a backward-flow traced position.

19. The non-transitory computer-readable medium of claim 15, wherein the content is hallucinated into the sub-region by video inpainting using a reference frame.

20. The non-transitory computer-readable medium of claim 15, the operations further comprising applying a weighting function to the gradient constraints, wherein the weighting function prioritizes information from the hallucinated content.

* * * * *